US007899401B2

(12) United States Patent
Tanaka et al.

(10) Patent No.: US 7,899,401 B2
(45) Date of Patent: Mar. 1, 2011

(54) RADIO COMMUNICATION DEVICE

(75) Inventors: Koichiro Tanaka, Hyogo (JP);
Tomohiro Kimura, Osaka (JP);
Naganori Shirakata, Osaka (JP); Shuya Hosokawa, Osaka (JP)

(73) Assignee: Panasonic Corporation, Osaka (JP)

( * ) Notice: Subject to any disclaimer, the term of this patent is extended or adjusted under 35 U.S.C. 154(b) by 924 days.

(21) Appl. No.: 11/628,039

(22) PCT Filed: Jun. 3, 2005

(86) PCT No.: PCT/JP2005/010247
§ 371 (c)(1),
(2), (4) Date: Jun. 19, 2007

(87) PCT Pub. No.: WO2006/003776
PCT Pub. Date: Jan. 12, 2006

(65) Prior Publication Data
US 2007/0259623 A1 Nov. 8, 2007

(30) Foreign Application Priority Data

Jun. 4, 2004 (JP) ................................. 2004-166834
Oct. 25, 2004 (JP) ................................. 2004-309379

(51) Int. Cl.
*H04B 17/00* (2006.01)
*H04B 7/24* (2006.01)
*H04B 1/00* (2006.01)
*H04B 7/00* (2006.01)
*H04Q 5/22* (2006.01)
(52) U.S. Cl. .......... 455/67.11; 455/39; 455/69; 340/10.1; 340/10.4
(58) Field of Classification Search ............. 455/39, 455/41.1, 41.2, 67.11, 69, 133, 150.1, 226.1, 455/227, 229; 340/10.1, 10.4, 10.52, 10.42
See application file for complete search history.

(56) References Cited

U.S. PATENT DOCUMENTS

| 5,692,018 | A | 11/1997 | Okamoto |
| 7,099,419 | B2 * | 8/2006 | Braun ........................... 375/350 |
| 7,388,934 | B2 * | 6/2008 | Legrand et al. ............... 375/329 |
| 7,747,220 | B2 * | 6/2010 | Edmonson et al. .......... 455/41.2 |
| 2002/0042274 | A1 | 4/2002 | Ades |
| 2003/0125040 | A1 | 7/2003 | Walton et al. |
| 2003/0185285 | A1 | 10/2003 | Talwar |
| 2004/0246889 | A1 | 12/2004 | Ogawa et al. |

FOREIGN PATENT DOCUMENTS

BA    8-288870    11/1996

(Continued)

OTHER PUBLICATIONS

Yang, K. et al., *Array Configuration Design for Space-Time Adaptive Processing Systems*, IEEE (Aug. 6, 2002), pp. 145-148.

(Continued)

*Primary Examiner* — Andrew Wendell
(74) *Attorney, Agent, or Firm* — Wenderoth, Lind & Ponack, L.L.P.

(57) ABSTRACT

A radio communication device that, even if it is interfered by a radio transmission station other than a radio transmission station with which it intends to communicate, estimates a signal transmitted from the intended radio transmission station by taking into account the influence of the interference, by obtaining an estimator of "s" that denotes a column vector representing a signal transmitted from the radio transmission station, in accordance with a following expression: $s=R_{ss}H^H(HR_{ss}H^H+R_{uu})^{-1}r$, where "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "$^H$" denotes a complex conjugate transposition, and "$^{-1}$" denotes an inverse matrix.

4 Claims, 25 Drawing Sheets

FOREIGN PATENT DOCUMENTS

| | | | |
|---|---|---|---|
| BB | 2002-527995 | | 8/2002 |
| JP | 10-4391 | | 1/1998 |
| JP | 2001-94618 | | 4/2001 |
| JP | 2003-124857 | | 4/2003 |
| JP | 03/041300 | | 5/2003 |
| JP | 2003-218831 | | 7/2003 |
| JP | 2004-64130 | | 2/2004 |
| JP | 2004-511957 | | 4/2004 |
| WO | 00/22783 | | 4/2000 |
| WO | WO 02/01825 | * | 3/2002 |
| WO | 02/32049 | * | 4/2002 |
| WO | 03/041300 | | 5/2003 |
| WO | 03/063380 | | 7/2003 |

OTHER PUBLICATIONS

Eduard A. Jorsweick et al., "Analysis of Multiuser MIMO systems with MMSE Receiver based on Worst Case Noise", in: 2004 ITG Workshop on Smart Antennas, May 19, 2004, pp. 122-129.

P. W. Wolniansky et al., "V-BLAST: An Architecture for Realizing Very High Data Rates Over the Rich-Scattering Wireless Channel", 1998 IEEE, pp. 295-300.

Anass Benjebbour et al., "Comparison of Ordered Successive Receivers for Space-Time Transmission", 2001 IEEE, pp. 2053-2057.

Eduard A. Jorsweick et al., "Analysis of Multiuser MIMO systems with MMSE Receiver based on Worst Case Noise", in: 2004 ITG Workshop on Smart Antennas, May 19, 2004, pp. 122-129.

P. W. Wolniansky et al., "V-BLAST: An Architecture for Realizing Very High Data Rates Over the Rich-Scattering Wireless Channel", 1998 IEEE, pp. 295-300.

Anass Benjebbour et al., "Comparison of Ordered Successive Receivers for Space-Time Transmission", 2001 IEEE, pp. 2053-2057.

Yang, K. et al., *Array Configuration Design for Space-Time Adaptive Processing Systems*, IEEE (Aug. 6, 2002), pp. 145-148.

* cited by examiner

RADIO COMMUNICATION DEVICE

TECHNICAL FIELD

The present invention relates to a radio communication device for performing radio communications, and specifically to a technology for receiving a signal transmitted from a radio transmission station using a plurality of antennas.

BACKGROUND ART

Some conventional communication systems using LAN (Local Area Network) include such a radio communication device that receives a signal from a radio transmission station via a plurality of antennas, and estimates a signal transmitted from a radio transmission station, based on the received signal and taking into account the influence of noise generated in the device (see Documents 1, 2).

Document 2 discloses a construction in which the properties of a signal reception method called V-BLAST have been improved. The radio communication device recited in Document 2 estimates a signal transmitted from a radio transmission station, based on (1) a coefficient representing the transmission properties of a signal transmitted between the radio communication device and the radio transmission station and (2) a signal received by the radio communication device. Here, the coefficient, which represents the transmission properties of a signal transmitted in a radio communication between the radio communication device and the radio transmission station, is represented by a matrix. The matrix is obtained by calculating a correlation between the signal received by the radio communication device and a training signal that is contained in a signal transmitted from a radio transmission station.

In this construction, if the training signal transmitted from a radio transmission station is known, the radio communication device can obtain a matrix that represents the transmission properties of the signal transmitted via the radio communication between the radio communication device and the radio transmission station.

Document 1: P. W. Wolniansky et al., "V-BLAST: An Architecture for Realizing Very High Data Rates Over the Rich-Scattering Wireless Channel", URSI International Symposium on Signals, Systems, and Electronics, September-October, 1998

Document 2: Anass Benjebbour et al., "Comparison of Ordered Successive Receivers for Space-Time Transmission", Vehicular Technology Conference, October, 2001

SUMMARY OF THE INVENTION

The Problems the Invention is Going to Solve

The above-described conventional construction, although it can estimate a signal transmitted from a radio transmission station by removing the influence of noise generated in the device, has a problem that if there is an interference station other than a radio transmission station with which the radio communication device intends to communicate, it becomes difficult for the radio communication device, by the influence of a signal received from the interference station, to accurately estimate a signal transmitted from the radio transmission station.

This is because in the above-described construction, when the radio communication device estimates a signal transmitted from a radio transmission station with which it intends to communicate, the radio communication device does not take into account the influence of a signal received from the interference station, and because the signal received from the interference station has far greater influence on the estimation of a signal transmitted from a radio transmission station than the noise generated in the device.

The object of the present invention is therefore to provide a radio communication device that estimates more accurately than conventional technologies a signal transmitted from a radio transmission station even if there is an interference station that interferes with a radio communication between the radio communication device and the radio transmission station, and to provide a radio communication system composed of a radio transmission station and the radio communication device.

Means to Solve the Problems

The above-described object is fulfilled by a radio communication device which identifies a radio transmission station as a communication partner based on a patterned signal which has a predetermined pattern and is contained in a signal transmitted from the radio transmission station, and performs a radio communication with the identified radio transmission station, the radio communication device comprising: a plurality of antennas; a signal receiving unit operable to receive a signal via the plurality of antennas; a first calculating unit operable to calculate, based on the received signal, a numerical sequence that indicates a property of a signal transmission path used in a radio communication with the radio transmission station; a second calculating unit operable to calculate, based on the received signal, a numerical sequence that indicates a property of an unnecessary signal that is a component of the received signal and does not have the predetermined pattern; and a transmission signal estimating unit operable to correct the received signal so as to be removed of the unnecessary signal based on the numerical sequence calculated by the second calculating unit, and estimate a signal transmitted from the radio transmission station based on the corrected received signal and the numerical sequence calculated by the first calculating unit, wherein the transmission signal estimating unit obtains an estimator "v" of "s" that denotes a column vector representing a signal transmitted from the radio transmission station, in accordance with a following expression: $v = RssH^H(HRssH^H + Ruu)^{-1}r$, wherein "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "$^H$" denotes a complex conjugate transposition, and "$^{-1}$" denotes an inverse matrix.

EFFECTS OF THE INVENTION

The radio communication device of the present invention with the above-described construction, in which it receives a signal from the radio transmission station via a plurality of antennas, can perform a stable communication even in a communication environment including many obstacles, compared with a case where only one antenna is used. In addition, with the above-described construction, the radio communication device of the present invention can estimate a signal transmitted from a radio transmission station by correcting the signal by removing the influence of the unnecessary signal contained in the received signal. For example, if there is an interference station that interferes with a radio communication with a desired radio transmission station, the radio communication device of the present invention calculates, by the second calculating unit, a numerical sequence that indicates the property of the signal transmitted from the interference station, and corrects the received signal by removing the influence of the signal transmitted from the interference station.

In the above-stated radio communication device, when elements of the column vector "s" are uncorrelated with each other and when each of the elements has an equivalent average power that is denoted as "p", the estimator "v" of the column vector "s" may be obtained in accordance with a following expression: $v=H^H(HH^H+(1/p)Ruu)^{-1}r$.

With the above-described construction, it is possible to obtain an estimator of the signal transmitted from the radio transmission station based on an expression that includes a smaller amount of calculation of the product of a matrix, when elements of the column vector "s" are uncorrelated with each other and when each of the elements has an equivalent average power, and therefore it is possible to reduce the amount of calculation required for the estimation of the transmission signal.

In the above-stated radio communication device, the second calculating unit may calculate the numerical sequence based on a signal received in a predetermined period, the signal receiving unit includes a down converter operable to convert the signal received via the plurality of antennas into an equivalent baseband signal, the transmission signal estimating unit estimates the signal transmitted from the radio transmission station based on the signal received in the predetermined period, and using the numerical sequence calculated by the second calculating unit, the radio communication device further comprising a gain control unit operable to control a gain of the down converter so that the down converter has substantially a same gain in the predetermined period and in a period during which the signal receiving unit receives a signal that is input to the transmission signal estimating unit for the signal estimation performed therein.

In the radio communication device with the above-described construction, the second calculating unit calculates the numerical sequence before the transmission signal estimating unit estimates the transmission signal, so that the transmission signal estimating unit can estimate the transmission signal using the numerical sequence calculated by the second calculating unit. Also, the second calculating unit and the transmission signal estimating unit perform a predetermined process using an equivalent baseband signal that is a result of a conversion by the down converter.

Meanwhile, if the gain of the down converters changes during reception of a signal, the properties of the signal transmission path used in a radio communication with the radio transmission station change. Accordingly, if the gain of the down converter is different between (i) the period during which the second calculating unit calculates the numerical sequence that indicates the property of the unnecessary signal and (ii) the period during which the transmission signal estimating unit estimates the transmission signal, the correction of the received signal by removing the unnecessary signal based on the numerical sequence calculated by the second calculating unit cannot be made appropriately when the transmission signal estimating unit estimates the transmission signal.

However, the radio communication device with the above-described construction can appropriately make the correction of the received signal by removing the unnecessary signal based on the numerical sequence calculated by the second calculating unit when the transmission signal estimating unit estimates the transmission signal. This is because the radio communication device with the above-described construction controls the gain of the down converter so that the down converter has substantially the same gain (i) in the period during which the second calculating unit calculates the numerical sequence that indicates the property of the unnecessary signal and (ii) in the period during which the transmission signal estimating unit estimates the transmission signal.

In the above-stated radio communication device, the second calculating unit may calculate the numerical sequence based on a signal received in a predetermined period, the signal receiving unit includes a down converter operable to convert the signal received via the plurality of antennas into an equivalent baseband signal, the transmission signal estimating unit estimates the signal transmitted from the radio transmission station based on the signal received in the predetermined period, and using the numerical sequence calculated by the second calculating unit, the radio communication device further comprising a gain control unit operable to correct, based on a first gain and a second gain, the numerical sequence that is calculated by the second calculating unit and indicates the property of the unnecessary signal, wherein the first gain is a gain of the down converter in the predetermined period, and the second gain is a gain of the down converter in a period during which the signal receiving unit receives a signal that is input to the transmission signal estimating unit for the signal estimation performed therein.

In the above-stated radio communication device, the gain control unit may perform the correction by obtaining "Ruu'" that denotes a numerical sequence resulted from the correction, in accordance with a following expression: $Ruu'=C_2 C_1^{-1} Ruu (C_2 C_1^{-1})^H$, wherein "$C_1$" denotes the first gain, "$C_2$" denotes the second gain, "Ruu" denotes a covariance matrix of the unnecessary signal calculated by the second calculating unit in the predetermined period, "$^H$" denotes a complex conjugate transposition, and "$^{-1}$" denotes an inverse matrix.

With the above-described construction, the radio communication device corrects, based on the first gain and the second gain, the numerical sequence that is calculated by the second calculating unit and indicates the property of the unnecessary signal, and estimates the transmission signal using the corrected numerical sequence. This makes it possible to appropriately make the correction of the received signal by removing the unnecessary signal when the transmission signal estimating unit estimates the transmission signal, even in a case where the down converter has different gains (i) in the period during which the second calculating unit calculates the numerical sequence that indicates the property of the unnecessary signal and (ii) in the period during which the transmission signal estimating unit estimates the transmission signal.

The above-stated radio communication device may further comprise a detecting unit operable to detect, based on the received signal, whether no signal has been transmitted from a radio communication device with which the radio communication device intends to communicate, wherein the second calculating unit calculates the numerical sequence based on: the received signal that is received within a predetermined period after the detecting unit detects that no signal has been transmitted; and the patterned signal.

In the above-stated radio communication device, the detecting unit may perform the detection based on an amplitude of the received signal.

In the above-stated radio communication device, the detecting unit may perform the detection based on whether or not the received signal contains the patterned signal.

The above-described object is also fulfilled by a radio communication system comprising the radio communication device defined above and a radio transmission station that performs a radio communication with the radio communication device, wherein the radio transmission station includes a transmission stop period setting unit operable to set a transmission stop period during which the radio transmission station stops transmitting signals and does not perform the radio communication with the radio communication device, and after the transmission stop period is set, transmission of signals is stopped during the set transmission stop period.

It is preferable that the numerical sequence indicating the property of the unnecessary signal is calculated in a period during which no signal is transmitted from the radio transmission station with which the radio communication device intends to communicate. However, in the radio communication device with the above-described construction, the second calculating unit can calculate the numerical sequence after it is detected based on the received signal that the received signal does not include a signal transmitted from the radio communication device. This makes it possible to calculate accurately the numerical sequence indicating the property of the unnecessary signal.

The above-stated radio communication device may further comprise a second judging unit operable to judge, based on the received signal, whether or not an amplitude of the unnecessary signal is larger than a predetermined value, wherein the second calculating unit calculates the numerical sequence using a signal received in a period during which the second judging unit judges that the amplitude of the unnecessary signal is larger than the predetermined value.

In a period during which the interference by the interference station is strong, there is high possibility that the estimation performed by the transmission signal estimating unit includes an error. However, the radio communication device with the above-described construction judges that the interference by the interference station is strong when it judges that the amplitude of the unnecessary signal is larger than the predetermined value, and the second calculating unit calculates the numerical sequence indicating the property of the unnecessary signal using a signal received in the period during which the interference by the interference station is strong. This construction reduces the maximum value of the error contained in the estimator of the signal transmitted from the radio transmission station.

The above-stated radio communication device may further comprise: a judging unit operable to judge, based on a patterned signal with a predetermined pattern contained in a signal transmitted from an interference station being a radio transmission station other than a radio transmission station with which the radio communication device intends to communicate, whether or not the interference station is identifiable; and a transmission path measuring unit operable to, if the judging unit judges that the interference station is identifiable, calculate, based on an interference signal received from the interference station and based on a patterned signal contained in the interference signal, a numerical sequence that indicates a property of a signal transmission path used in a radio communication with the interference station, wherein if the judging unit judges that the interference station is identifiable, the second calculating unit calculates the numerical sequence indicating the property of the unnecessary signal, based on the numerical sequence calculated by the transmission path measuring unit.

With the above-described construction, the radio communication device judges, based on the patterned signal with the predetermined pattern contained in the signal transmitted from the interference station, whether or not the interference station is identifiable, and if it is judged that the interference station is identifiable, the transmission path measuring unit calculates the numerical sequence that indicates the property of the signal transmission path used in the radio communication with the interference station.

After the calculation by the transmission path measuring unit, the second calculating unit of the radio communication device calculates the numerical sequence based on the numerical sequence indicating the property of the signal transmission path used in the radio communication with the interference station, and based on the signal transmitted from the interference signal. With this construction, it is possible to calculate faster and more accurately the numerical sequence indicating the property of the unnecessary signal, compared with the case where the covariance matrix Ruu is calculated after the unnecessary signal is measured.

The above-described object is also fulfilled by a radio communication system comprising the above-defined radio communication device and a radio transmission station that performs a radio communication with the radio communication device, wherein the radio communication device includes a transmission stop request transmitting unit operable to transmit a transmission stop request signal, which requests to stop transmitting signals for a predetermined period, to the radio transmission station, the radio transmission station includes: a receiving unit operable to receive a signal; and a control unit operable, if the receiving unit receives the transmission stop request signal, to perform a control so that transmission of signals is stopped for a predetermined period, wherein if the transmission stop request transmitting unit transmits the transmission stop request signal, the second calculating unit calculates the numerical sequence using a signal received in the predetermined period.

In the above-stated radio communication system, the transmission stop request transmitting unit may transmit the transmission stop request signal that includes stop period information indicating a period for which transmission of signals is stopped, the control unit performs the control based on the stop period information, and the second calculating unit calculates the numerical sequence using a signal received in the period indicated by the stop period information.

In the above-stated radio communication system, the transmission stop request transmitting unit may transmit the transmission stop request signal that includes transmission resumption timing information indicating a timing at which transmission of signals by the radio transmission station is resumed, the control unit performs the control based on the timing indicated by the transmission resumption timing information, and the second calculating unit calculates the numerical sequence using a signal received in a period that extends from the transmission of the transmission stop request signal to the timing indicated by the transmission resumption timing information.

In the above-stated radio communication system, the transmission stop request transmitting unit may include a release signal transmitting unit operable to, if the second calculating unit calculates the numerical sequence after the transmission of the transmission stop request signal, transmit to the radio transmission station a release signal that requests to release stoppage of signal transmission by the radio transmission station, and the control unit releases the stoppage of signal transmission when the receiving unit receives the release signal.

With the above-described construction in which the radio communication device transmits the transmission stop request signal, which requests to stop transmitting signals, to the radio transmission station, and upon receiving the transmission stop request signal, the radio transmission station stops transmitting signals for the predetermined period, the radio communication device calculates the numerical sequence based on the unnecessary signal on the presumption that it does not receive a signal from the radio transmission station for the predetermined period. This makes it possible to calculate the numerical sequence based on the unnecessary signal accurately.

In the above-stated radio communication device, the second calculating unit may include a calculating unit operable to calculate the numerical sequence indicating the property of the unnecessary signal, based on the received signal, the signal estimated by the transmission signal estimating unit, and the numerical sequence calculated by the first calculating unit, and the transmission signal estimating unit corrects the received signal so as to be removed of the unnecessary signal based on the numerical sequence calculated by the calculating unit, and performs the estimation based on the corrected received signal and the numerical sequence calculated by the first calculating unit.

With the above-described construction in which each time the radio communication device receives a signal and the transmission signal estimating unit estimates a signal, the radio communication device calculates the numerical sequence indicating the property of the unnecessary signal and then estimates a signal using the calculated numerical sequence, it is possible for the radio communication device to correct the transmission signal so as to be removed of the influence of the interference, following the change of the influence of the interference, even in the case where the influence of the interference by the interference station changes greatly.

The above-stated radio communication device may further comprise: a detecting unit operable to detect a modulation level of a multilevel modulation of a signal transmitted by the radio transmission station; a multilevel modulation level judging unit operable to judge whether or not the detected modulation level is smaller than a predetermined value; and a calculating unit controlling unit operable to, if the multilevel modulation level judging unit judges that the detected modulation level is smaller than the predetermined value, control the calculating unit to calculate the numerical sequence.

With the above-described construction, upon receiving from the radio transmission station a signal containing signals having both small and great modulation levels of the multilevel modulation, the radio communication device calculates the numerical sequence indicating the property of the unnecessary signal, using a signal having a small modulation level of the multilevel modulation. For example, in the case where a transmission signal includes both a 64-QAM signal and a 16-QAM signal, the radio communication device calculates the numerical sequence indicating the property of the unnecessary signal, using the 16-QAM signal.

In general, the smaller the modulation level of the multilevel modulation is, the smaller the error of the estimator for a transmission signal is. Accordingly, it is possible to reduce the error of the obtained numerical sequence indicating the property of the unnecessary signal, by calculating the numerical sequence using a signal having a small modulation level of the multilevel modulation, not using a signal having a great modulation level of the multilevel modulation.

In the above-stated radio communication device, the signal transmitted by the radio transmission station may be a frequency-division multiplex signal, the signal receiving unit receives the frequency-division multiplex signal, the first calculating unit and the second calculating unit calculates the numerical sequence in correspondence with each frequency component of the frequency-division multiplex signal, and the transmission signal estimating unit performs the estimation in correspondence with each frequency component of the frequency-division multiplex signal.

In the above-stated radio communication device, the frequency-division multiplex signal may be an OFDM signal.

In the above-stated radio communication device, the frequency-division multiplex signal may be a wavelet signal.

With the above-described construction, it is possible to estimate a transmission signal more accurately than conventional technologies even if the signal transmitted by the radio transmission station is a frequency-division multiplex signal. This makes it possible to achieve a radio communication device that has the anti-multipath property and the anti-interference property, where these properties are required in radio communications performed with the frequency division multiplex method.

The above-stated radio communication device may further comprise: a reliability evaluating unit operable to calculate a residual error contained in the signal estimated by the transmission signal estimating unit, based on the numerical sequence calculated by the first calculating unit and the numerical sequence calculated by the second calculating unit.

In the above-stated radio communication device, the reliability evaluating unit may obtain an estimator "$z[k]$" of a residual error corresponding to a $k^{th}$ element of "v", in accordance with a following expression: $z[k]=(W[k]H-I_M[k])Rss(H^H W[k]^H - I_M[k]^H) + W[k]RuuW[k]^H$, wherein "W" is obtained in accordance with a following expression: $W=RssH^H(HRssH^H+Ruu)^{-1}r$, wherein "s" denotes a column vector representing a signal transmitted from the radio transmission station, "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "v" denotes a column vector representing, by an equivalent baseband system, an estimator obtained by the transmission signal estimating unit, a dimension of the column vector "s" is represented as "M×1", "$^H$" denotes a complex conjugate transposition, "$^{-1}$" denotes an inverse matrix, wherein W[k] represents a row vector of a $k^{th}$ row when W represents a matrix; W[k] represents a $k^{th}$ element of W when W represents a column vector; $I_M[k]$ represents a row vector of a $k^{th}$ row in an M×M unit matrix when M is 2 or more; and $I_M[k]$ represents 1 when M is 1.

In the above-stated radio communication device, the reliability evaluating unit may obtain an estimator "$z[k]$" of a residual error corresponding to a $k^{th}$ element of "v", in accordance with a following expression: $z[k]=p(W[k]H-I_M[k])(H^H W[k]^H - I_M[k]^H) + W[k]RuuW[k]^H$, wherein "W" is obtained in accordance with a following expression when elements of a transmission signal "s" are uncorrelated with each other and when each element has an equivalent average power that is denoted as "p": $W=H^H(HH^H+(1/p)Ruu)^{-1}$, wherein "s" denotes a column vector representing a signal transmitted from the radio transmission station, "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "v" denotes a column vector representing, by an equivalent baseband system, an estimator obtained by the transmission signal estimating unit, a dimension of the column vector "s" is represented as "M×1", "$^H$" denotes a complex conjugate transposition, "$^{-1}$" denotes an inverse matrix, wherein W[k] represents a row vector of a $k^{th}$ row when W represents a matrix; W[k] represents a $k^{th}$ element of W when W represents a column vector; $I_M[k]$ represents a row vector of a $k^{th}$ row in an M×M unit matrix when M is 2 or more; and $I_M[k]$ represents 1 when M is 1.

In the radio communication device with the above-described construction, the reliability evaluating unit calculates the residual error contained in the signal estimated by the transmission signal estimating unit.

In general, the greater the residual error is, the greater the error of the estimator for a transmission signal is.

Accordingly, it is possible for the radio communication device, by using the residual error contained in the estimated signal, to, for example, judge whether or not the estimated signal has sufficient reliability for use in the radio communication.

The above-stated radio communication device may further comprise an error correcting unit operable to correct an error included in the signal estimated by the transmission signal estimating unit, based on the signal estimated by the transmission signal estimating unit and based on the residual error calculated by the reliability evaluating unit.

With the above-described construction, the error correcting unit refers to the residual error when it corrects the error included in the estimated signal. This improves the error correction ability of the error correcting unit, compared with the case where the error correcting unit does not have information on the residual error to refer to.

The improvement of the error correction ability can be achieved by, for example, a construction in which when the residual error is great, namely, when the error of the estimated signal is great, the estimator of the signal is disregarded; and when the residual error is small, namely, when the error of the estimated signal is small, the importance of the estimator of the signal is stressed.

In the above-stated radio communication device, the error correcting unit may perform the correction in accordance with an inverse of a square root of the residual error.

With the above-described construction, it is possible to improve the error correction ability of the error correcting unit in the case where the error correction ability can be improved when the amplitude of the residual error of the estimated signal is constant.

DESCRIPTION OF CHARACTERS

| | |
|---|---|
| 101 | antennas |
| 102 | up converters |
| 103 | communication control unit |
| 104 | transmission stop period setting unit |
| 105 | transmission stop request receiving unit |
| 201 | antennas |

| | |
|---|---|
| 202 | down converters |
| 203 | transmission path measuring unit |
| 204 | unnecessary signal measuring unit |
| 205 | transmission signal estimating unit |
| 206 | control unit |
| 207 | non-transmission period detecting unit |
| 208 | strong interference period detecting unit |
| 209 | interference transmission path measuring unit |
| 210 | unnecessary signal measuring unit |
| 211 | transmission stop request transmitting unit |
| 212 | unnecessary signal measuring unit |

DETAIL DESCRIPTION OF THE INVENTION

The following will describe embodiments of the present invention with reference to the attached drawings.

Embodiment 1

Figure 1:
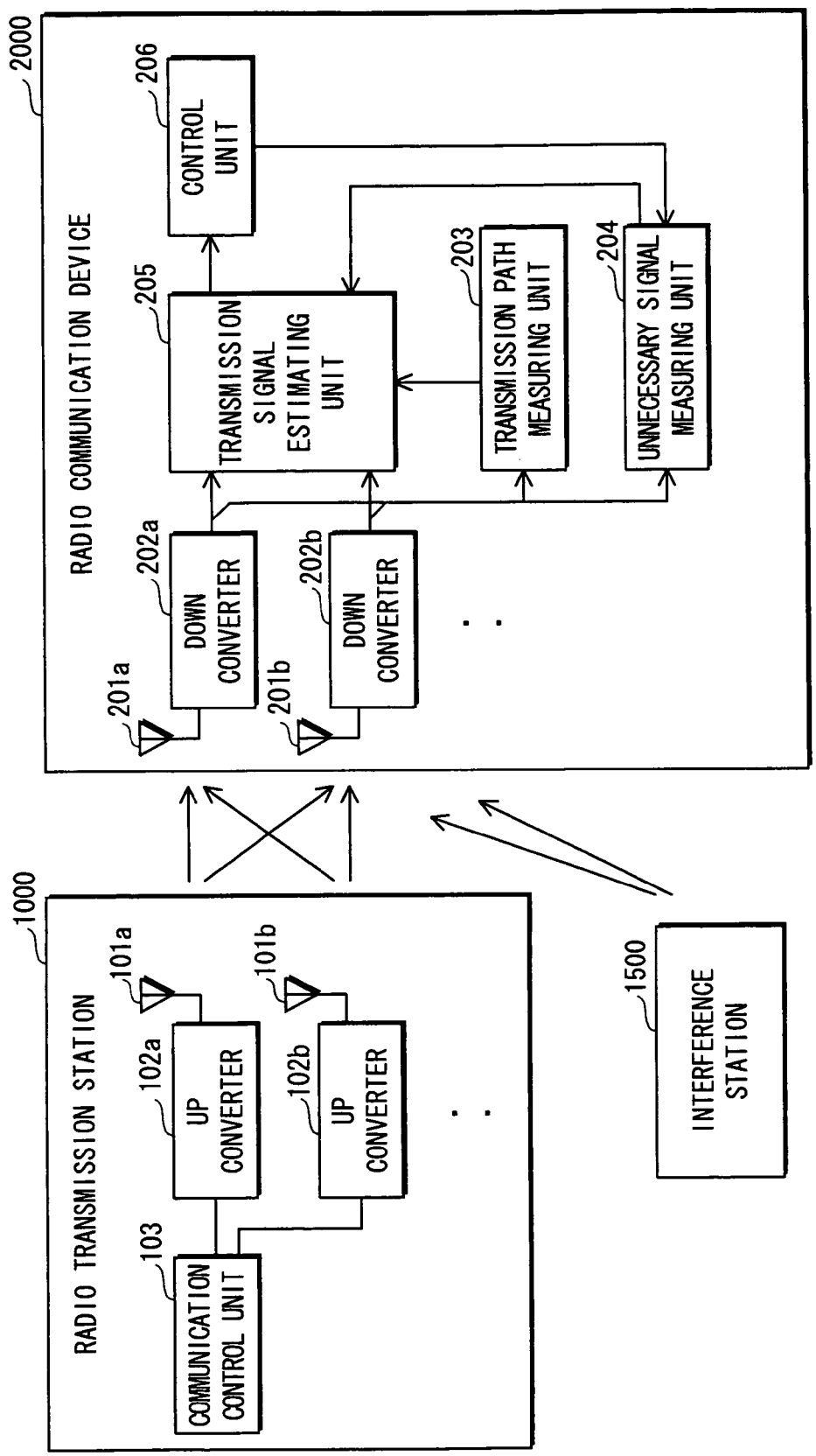
FIG. 1 is a functional block diagram of the radio communication system in Embodiment 1 of the present invention.

FIG. 1 is a functional block diagram of the radio communication system in Embodiment 1 of the present invention. As shown in FIG. 1, the radio communication system in Embodiment 1 includes a radio transmission station 1000, a radio communication device 2000, and an interference station 1500.

The radio transmission station 1000 and the radio communication device 2000 perform a radio communication in accordance with a specified protocol. The radio communication system of the present invention may be achieved as, for example, a wireless LAN system that performs a radio communication by a communication method specified in IEEE802.11n.

<Radio Transmission Station>

As shown in FIG. 1, the radio transmission station 1000 includes antennas 101 (antenna 100a, antenna 101b, ... ), up converters 102 (up converter 102a, up converter 102b, ... ), and a communication control unit 103.

The radio transmission station 1000 includes M number of antennas 101 and M number of up converters 102. The M number of antennas 101 correspond to the M number of up converters 102 on a one-to-one basis. The antennas 101 transmit signals, which are input from the up converters 102, into the air. Here, "M" is integer 1 or more.

The M number of up converters 102 convert transmission signals, which are represented by an equivalent baseband system, to high-frequency signals, amplify the power of the signals to such a level that is enough to perform a radio communication with a radio communication device, and output the high-frequency signals to the antennas 101.

The communication control unit 103 includes a CPU (Central Processing Unit), a ROM (Read Only Memory), a RAM (Random Access Memory), and a modulation/demodulation circuit, and performs a process of controlling a radio communication with a radio communication device, in accordance with a program stored in the ROM.

It should be noted here that a signal transmitted by the communication control unit 103 via the antennas 101 includes a training signal of a predetermined pattern, and the radio communication device 2000 identifies a radio transmission station 1000 being a communication partner, based on the training signal.

<Interference Station>

The interference station 1500 has a construction that is unknown to the radio communication device 2000, and transmits an interference signal, which interferes with the radio communication between the radio transmission station 1000 and the radio communication device 2000.

<Radio Communication Device>

The radio communication device 2000 identifies a radio transmission station being a communication partner, based on (i) the training signal of a predetermined pattern contained in a signal transmitted from the radio transmission station 1000, and (ii) the address information unique to the radio transmission station 1000, and performs a radio communication with the identified radio transmission station 1000.

As shown in FIG. 1, the radio communication device 2000 includes antennas 201 (antenna 201a, antenna 201b, ... ), down converters 202 (down converter 202a, down converter 202b, ... ), a transmission path measuring unit 203, an unnecessary signal measuring unit 204, a transmission signal estimating unit 205, and a control unit 206.

The radio communication device 2000 includes N number of antennas 201 and N number of down converters 202. The N number of antennas 201 correspond to the N number of down converters 202 on a one-to-one basis. The antennas 201 receive signals, and output the received signals to the down converters 202. Here, "N" is integer 2 or more.

The N number of down converters 202 convert the high-frequency signals received via the antennas 201 into signals represented by the equivalent baseband system. The down converters 202 output the converted equivalent baseband signals to the transmission path measuring unit 203, the unnecessary signal measuring unit 204, and the transmission signal estimating unit 205.

The transmission path measuring unit 203 is an integrated circuit that calculates a transmission path matrix that indicates properties of a signal transmission path used in a radio communication with the radio transmission station 1000. The transmission path measuring unit 203 is provided with a memory for storing preliminarily the signal with the predetermined pattern contained in the signal transmitted from the radio transmission station 1000. After receiving a signal output from a down converter 202, the transmission path measuring unit 203 extracts the signal with the predetermined pattern from the received signal, and obtains a transmission path matrix H by calculating a correlation between the signal with the predetermined pattern and the preliminarily stored signal. The transmission path measuring unit 203 outputs the obtained transmission path matrix H to the transmission signal estimating unit 205.

The unnecessary signal measuring unit 204 is an integrated circuit that calculates a covariance matrix of an unnecessary signal. It should be noted here that an unnecessary signal is composed of the following components of a received signal: (i) a component that was transmitted from the interference station 1500 and received by the radio communication device 2000; and a component that was influenced by a noise generated in the radio communication device 2000. The unnecessary signal measuring unit 204, under the control of the control unit 206, performs a process of calculating a covariance matrix Ruu at a predetermined timing. The unnecessary signal measuring unit 204 outputs the obtained covariance matrix Ruu to the transmission signal estimating unit 205.

The transmission signal estimating unit 205 is an integrated circuit that performs a process of estimating a signal transmitted from the radio transmission station 1000. The transmission signal estimating unit 205 is provided with a memory for storing the transmission path matrix H output from the transmission path measuring unit 203, and a memory for storing the covariance matrix Ruu of the unnecessary signal output from the unnecessary signal measuring unit 204, and obtains an estimator for a signal transmitted from the radio transmission station 1000, in accordance with a predetermined expression, based on the transmission path matrix H, covariance matrix Ruu, and the signal output from the down converters 202. The transmission signal estimating unit 205 outputs the obtained estimator for a transmission signal to the control unit 206.

The control unit 206 includes a CPU, ROM, and RAM, receives an estimator for a transmission signal from the transmission signal estimating unit 205, and controls a radio communication with the radio transmission station 1000, based on a program stored in the RAM.

The control unit 206 also controls the timing at which the unnecessary signal measuring unit 204 calculates the covariance matrix Ruu of the unnecessary signal, by transmitting a measurement start instruction signal and a measurement end instruction signal to the unnecessary signal measuring unit 204 to cause it to start and end the calculation of the covariance matrix Ruu, respectively.

<Operation>

The radio communication device 2000 operates as follows.

<Transmission Path Matrix Calculation Process>

Figure 2:
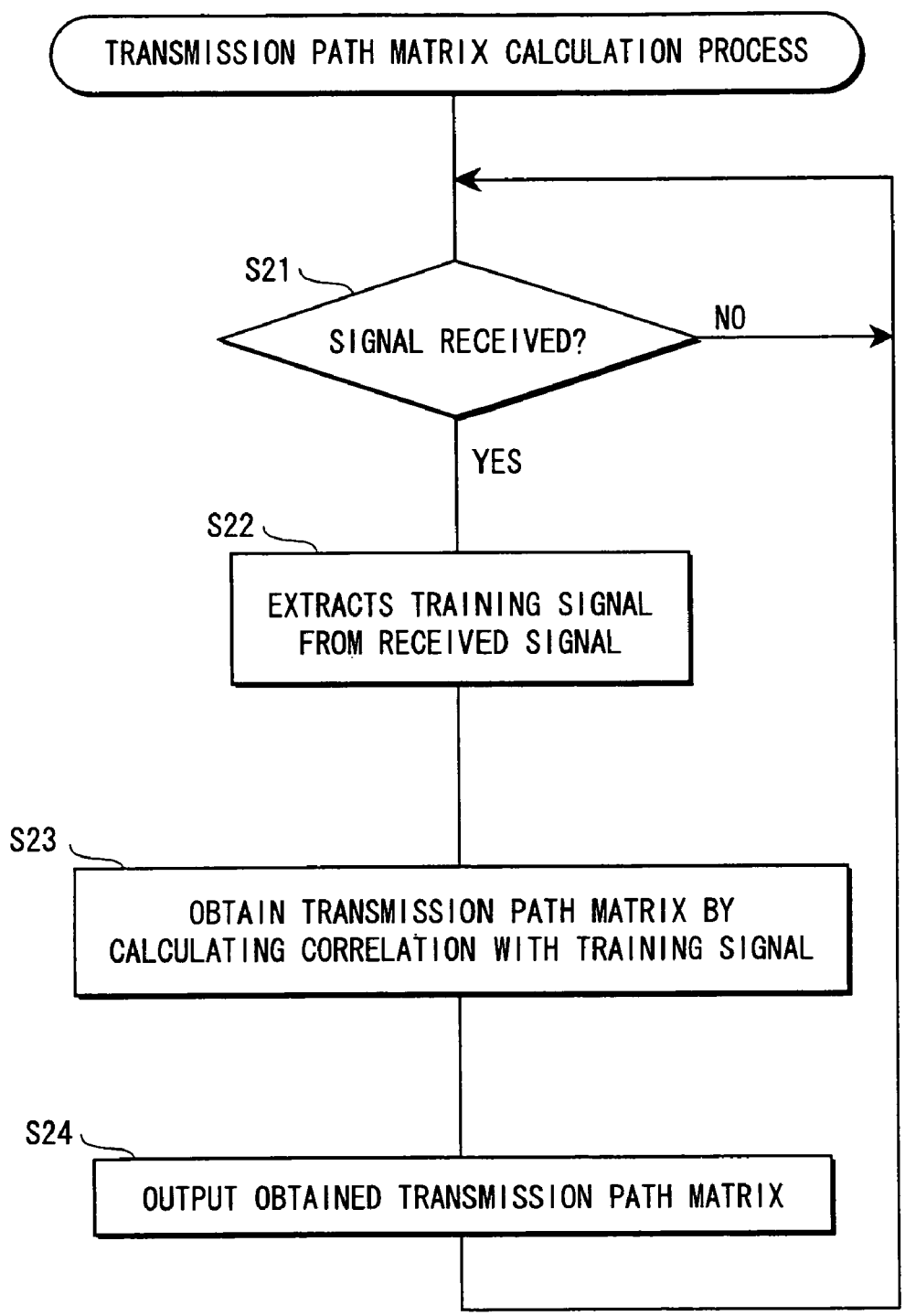
FIG. 2 is a flowchart showing the process of calculating the transmission path matrix H, performed by the transmission path measuring unit 203.

FIG. 2 is a flowchart showing the process of calculating the transmission path matrix H, performed by the transmission path measuring unit 203.

As shown in FIG. 2, upon receiving a signal from the down converters 202 (YES in step S21), the transmission path measuring unit 203 extracts a training signal from the received signal (step S22).

The transmission path measuring unit 203 then obtains a transmission path matrix H, which indicates the properties of the signal transmission path used in the radio communication with the radio transmission station 1000, by calculating a correlation between the extracted training signal and the signal with the predetermined pattern preliminarily stored in the memory (step S23). The transmission path measuring unit 203 outputs the obtained transmission path matrix H to the transmission signal estimating unit 205 (step S24), and waits until another signal is received (NO in step S21).

By operating as described above, the transmission path measuring unit 203 calculates the transmission path matrix H each time it receives a signal, and outputs the calculated transmission path matrix H to the transmission signal estimating unit 205.

<Covariance Matrix Calculation Process>

Next, how the unnecessary signal measuring unit 204 operates will be described.

The unnecessary signal measuring unit 204 starts calculating the covariance matrix Ruu of the unnecessary signal as it receives the measurement start instruction signal from the control unit 206, and ends the calculation as it receives the measurement end instruction signal.

Figure 3:
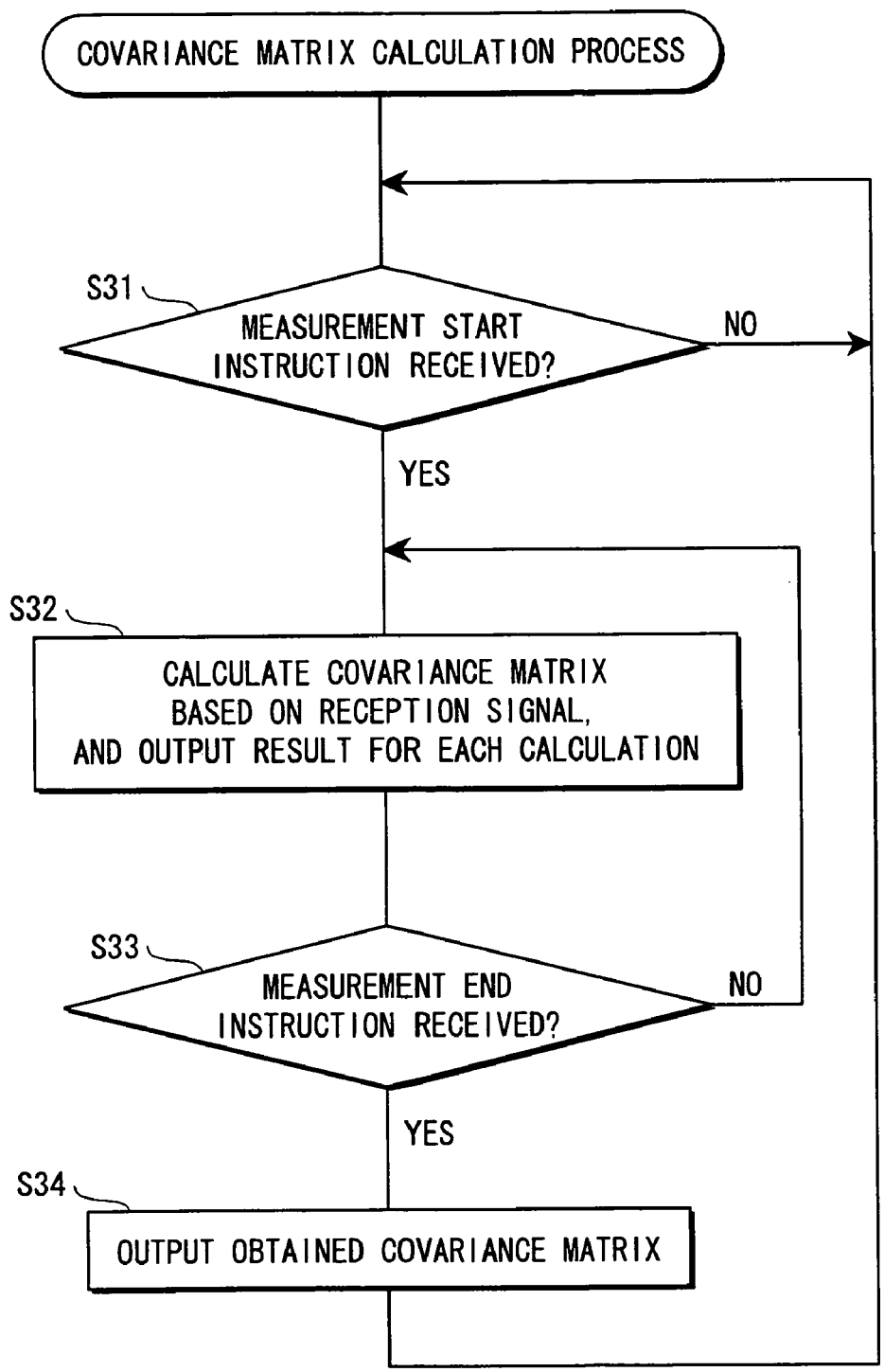
FIG. 3 is a flowchart showing the process of calculating the covariance matrix Ruu of the unnecessary signal, performed by the unnecessary signal measuring unit 204.

FIG. 3 is a flowchart showing the process of calculating the covariance matrix Ruu of the unnecessary signal, performed by the unnecessary signal measuring unit 204.

As shown in FIG. 3, upon receiving a measurement start instruction signal from the control unit 206 (YES in step S31), the unnecessary signal measuring unit 204 calculates the covariance matrix Ruu of the unnecessary signal based on the reception signal output from the down converters 202, and outputs the calculated covariance matrix Ruu to the transmission signal estimating unit 205, for each calculation (step S32).

The unnecessary signal measuring unit 204 continues the calculation and the outputting (step S32) until it receives the measurement end instruction signal from the control unit 206 (NO in step S33). Upon receiving the measurement end instruction signal from the control unit 206 (YES in step S33), the unnecessary signal measuring unit 204 obtains a covariance matrix Ruu by completing the calculation that was being performed when the measurement end instruction signal was received, and outputs the obtained covariance matrix Ruu to the transmission signal estimating unit 205 (step S34), and waits until another measurement start instruction signal is received (NO in step S31).

<Transmission Signal Estimation Process>

The transmission signal estimating unit 205 receives and stores in the memory the transmission path matrix H output from the transmission path measuring unit 203 and the covariance matrix Ruu of the unnecessary signal output from the unnecessary signal measuring unit 204, and each time a value of the transmission path matrix H or the covariance matrix Ruu is output, the transmission signal estimating unit 205 overwrites a corresponding value in the memory with the newly output value.

Figure 4:
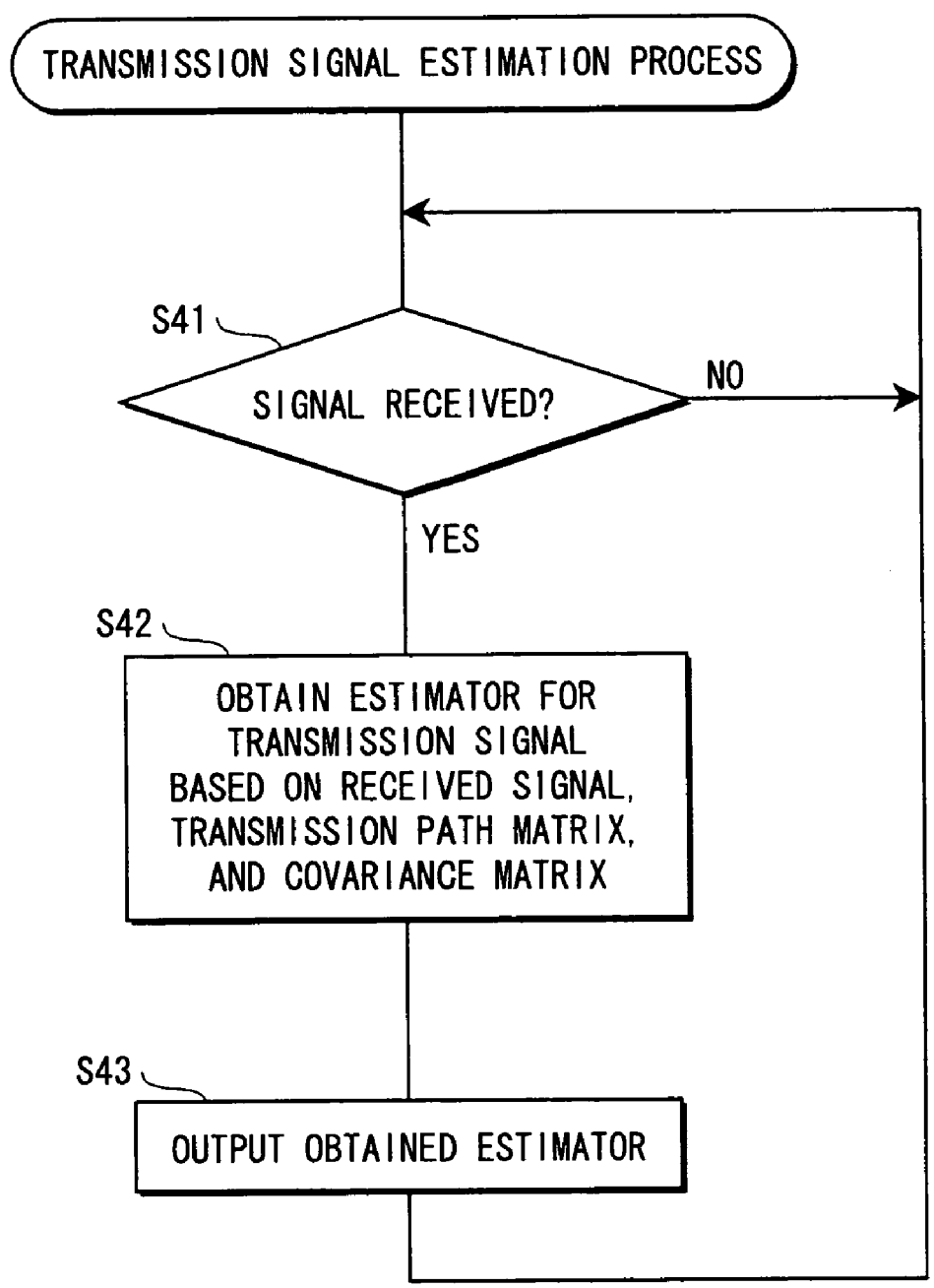
FIG. 4 is a flowchart showing the process of estimating a signal transmitted from the radio transmission station 1000, performed by the transmission signal estimating unit 205.

FIG. 4 is a flowchart showing the process of estimating a signal transmitted from the radio transmission station 1000, performed by the transmission signal estimating unit 205.

As shown in FIG. 4, upon receiving a signal from the down converters 202 (YES in step S41), the transmission signal estimating unit 205 obtains an estimator for a signal transmitted from the radio transmission station 1000 by performing a calculation in accordance with a predetermined expression that will be explained later, based on the received signal, the transmission path matrix H, and covariance matrix Ruu (step S42). The transmission signal estimating unit 205 outputs the obtained estimator for the transmission signal to the control unit 206 (step S43), and waits until another signal is received (NO in step S41).

Here will be explained the predetermined expression that is used in estimating a signal transmitted from the radio transmission station 1000.

In the expression, "s" represents a column vector that represents a signal transmitted from the radio transmission station 1000, "Rss" represents a covariance matrix of "s", "r" represents a column vector that represents an equivalent baseband signal converted from the reception signal by the down converters 202, "H" represents a transmission path matrix that indicates properties of a signal transmission path including the up converters 102 and the down converters 202, and "Ruu" represents a covariance matrix that is output by the unnecessary signal measuring unit 204 and held by the transmission signal estimating unit 205. Also, the sign "$^H$" represents a complex conjugate transposition, and the sign "$^{-1}$" represents an inverse matrix. It should also be noted that s=M×1 vector, r=N×1 vector, H=N×M matrix, and v=M×1 vector.

Under these conditions, the transmission signal estimating unit 205 obtains estimator "v" for transmission signal "s" in accordance with the following expression.

$$v = RssH^H(HRssH^H + Ruu)^{-1}r \qquad \text{[Expression 1]}$$

The following is explanation of [Expression 1].

The [Expression 1] is used to obtain the minimum mean squared error of transmission signal "s" for estimator "v".

Here, how to derive [Expression 1] will be described in the following, where "x" represents a column vector that represents a signal transmitted from the interference station 1500, "G" represents a transmission path matrix that indicates properties of a signal transmission path from the interference station 1500 to the radio communication device 2000 including the down converters 202, "n" represents a noise that occurs in the down converters 202, and "u" represents a unnecessary signal component of a received signal. It should also be noted that x=L×1 vector, G=N×L matrix, and u=N×1 vector.

The reception signal "r" is represented by the following expression [Expression 2].

$$r = Hs + Gx + n \quad \text{[Expression 2]}$$

The estimator "v" is obtained by the following expression [Expression 3].

$$v = Wr \quad \text{[Expression 3]}$$

It should be noted here that W=M×N matrix.

The mean squared error "e" of transmission signal "s" for estimator "v" is represented by the following expression [Expression 4].

$$e = E[(v-s)^H (v-s)] \quad \text{[Expression 4]}$$

Here, "E" represents an expected value.

If the above-described [Expression 2], [Expression 3], and [Expression 4] are modified under the condition that the mean squared error "e" is the minimum value thereof, value "W" is obtained by the following expression [Expression 5].

$$W = RssH^H (HRssH^H + GRxxG^H + qI_N)^{-1} r \quad \text{[Expression 5]}$$

In this expression, "Rxx" represents a covariance matrix of "x", "q" represents an average power of the noises corresponding to antennas and down converters 202 in one system, and "$I_N$" represents a unit matrix of N×M.

Here, unnecessary signal "u" is represented by the following expression [Expression 6].

$$u = Gx + n \quad \text{[Expression 6]}$$

Hence, covariance matrix "Ruu" of unnecessary signal "u" is represented by the following expression [Expression 7].

$$\begin{aligned} Ruu &= E[(Gx+n)(Gx+n)^H] \\ &= E[Gxx^H G^H] + E[nn^H] \\ &= GRxxG^H + qI_n^{-1} \end{aligned} \quad \text{[Expression 7]}$$

The following expression [Expression 8] is obtained from [Expression 7] and [Expression 5].

$$W = RssH^H (HRssH^H + Ruu)^{-1} \quad \text{[Expression 8]}$$

Lastly, the expression [Expression 1] is obtained from [Expression 8] and [Expression 3].

It should be noted here that in regards with [Expression 1], "Rss" can be obtained from the statistical characteristics of the transmission signal "s", and as "H", the transmission path matrix H, which is output from the transmission path measuring unit 203 and stored in the memory of the transmission signal estimating unit 205, is used.

The expression "Rss=$pI_M$" is true when the elements of the transmission signal "s" are uncorrelated with each other and when each element has an equivalent average power that is represented as "p". In this case, [Expression 1] can be modified as the following [Expression 9], and the transmission signal estimating unit 205 can estimate a transmission signal in accordance with [Expression 9].

$$v = H^H (HH^H + (1/p)Ruu)^{-1} r \quad \text{[Expression 9]}$$

<Gain Correction Process>

The radio communication device 2000 needs to preliminarily calculate the covariance matrix Ruu in accordance with the unnecessary signal u before the transmission signal estimating unit 205 estimates a transmission signal using the above-described [Expression 1] or [Expression 9]. Accordingly, the unnecessary signal measuring unit 204 is caused to calculate the covariance matrix Ruu before a radio communication with the radio transmission station 1000 is started, and the estimation of the transmission signal is performed after the radio communication with the radio transmission station 1000 is started.

Meanwhile, the transmission path matrix H included in the above-described [Expression 1] and [Expression 9] is a matrix that indicates the properties of the signal transmission path including the down converters 202 that is used in the radio communication between the radio transmission station 1000 and the radio communication device 2000.

Accordingly, if the gain of the down converters 202 changes during reception of a signal, the properties of the signal transmission path change.

Accordingly, if the gain of the down converters 202 is different between the period during which the unnecessary signal measuring unit 204 calculates the covariance matrix Ruu and the period during which the transmission signal estimating unit 205 estimates a transmission signal, the transmission path matrix indicating the properties of the signal transmission path is also different between the periods. When this happens, the value of the covariance matrix Ruu may not be appropriate in the period during which the transmission signal estimating unit 205 estimates a transmission signal.

To address this problem, the radio communication device 2000 of the present invention corrects the covariance matrix Ruu using the gain of the down converters 202 in each of the above-described two periods, so that the transmission signal estimating unit 205 can estimates a transmission signal using the corrected value.

The following explains the expressions used for correcting the covariance matrix Ruu using the gain of the down converters 202 in each of the periods.

In the following expressions, "$H_0$" represents a matrix that indicates a signal transmission path from the radio transmission station 1000 to the down converters 202, "$G_0$" represents a matrix that indicates a signal transmission path from the interference station to the down converters 202, "$C_1$" represents a gain of the down converters 202 in the period during which the unnecessary signal measuring unit 204 calculates the covariance matrix Ruu, "$n_1$" represents a noise converted into the input of the down converters 202, "$r_1$" represents a received signal, "$C_2$" represents a gain of the down converters 202 in the period during which the transmission signal estimating unit 205 estimates a transmission signal, "$n_2$" represents a noise converted into the input of the down converters 202, and "$r_2$" represents a received signal.

The values "$r_1$" and "$r_2$" are represented by the following expressions [Expression 10] and [Expression 11], respectively.

$$r_1 = C_1 (G_0 x + n_1) \quad \text{[Expression 10]}$$

$$r_2 = C_2 (H_0 s + G_0 x + n_2) \quad \text{[Expression 11]}$$

The covariance matrix Ruu is represent by the following expression [Expression 12] that is obtained from [Expression 10].

$$Ruu = C_1 (G_0 Rxx G_0^H + E[n_1 n_1^H]) C_1^H \quad \text{[Expression 12]}$$

On the other hand, a covariance matrix Ruu', which is intended to be used in the period during which the transmission signal is estimated, is represent by the following expression [Expression 13].

$$Ruu' = C_2 (G_0 Rxx G_0^H + E[n_2 n_2^H]) C_2^H \quad \text{[Expression 13]}$$

Here, on the assumption that the difference between the variance of $n_1$ and the variance of $n_2$ is small, the covariance matrix Ruu' is represented by the following expression [Expression 14] that is obtained from [Expression 12] and [Expression 13].

$$Ruu' = C_2 C_1^{-1} Ruu (C_2 C_1^{-1})^H \qquad \text{[Expression 14]}$$

By correcting the covariance matrix Ruu as explained above, the transmission signal estimating unit 205 can use the covariance matrix Ruu' represented by [Expression 14], instead of using the covariance matrix Ruu. This enables the estimation of transmission signal to be performed correctly.

The following describes a process performed by the radio communication device 2000 to correct the covariance matrix Ruu using the above-described expressions for the correction.

The transmission signal estimating unit 205 receives a value indicating the gain of the down converters 202 from the down converters 202, and outputs the received value to the control unit 206.

The control unit 206, having received the value indicating the gain of the down converters 202 from the transmission signal estimating unit 205, obtains another value indicating the gain of the down converters 202 in the period during which the unnecessary signal measuring unit 204 calculates the covariance matrix Ruu, and outputs the obtained value to the transmission signal estimating unit 205.

The transmission signal estimating unit 205 receives from the control unit 206 the value indicating the gain of the down converters 202 in the period during which the unnecessary signal measuring unit 204 calculates the covariance matrix Ruu, and stores the received value of the gain in the memory.

Figure 5:
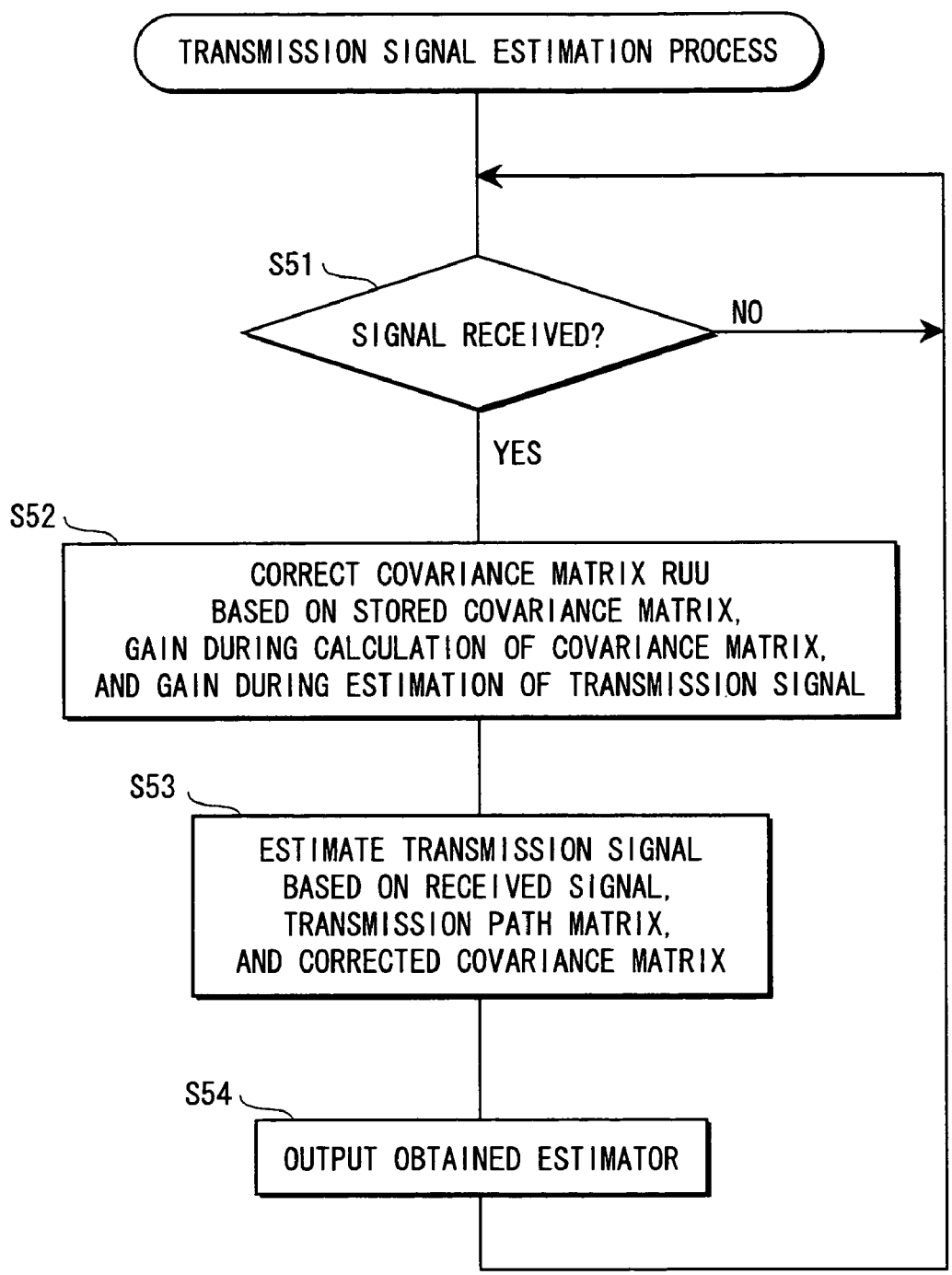
FIG. 5 is a flowchart showing the process of correcting the covariance matrix Ruu using the gain of the down converters 202, performed by the transmission signal estimating unit 205.

FIG. 5 is a flowchart showing the process of correcting the covariance matrix Ruu using the gain of the down converters 202, performed by the transmission signal estimating unit 205.

As shown in FIG. 5, upon receiving a signal from the down converters 202 (YES in step S51), the transmission signal estimating unit 205 corrects the covariance matrix Ruu to obtain the corrected covariance matrix Ruu' in accordance with the above-described [Expression 14] using the stored covariance matrix Ruu, the gain of the down converters 202 in the period during which the covariance matrix Ruu is calculated, and the gain of the down converters 202 in the period during which a transmission signal is estimated (step S52).

After this, the transmission signal is estimated based on the received signal, the transmission path matrix H, and the corrected covariance matrix Ruu'.

The estimator obtained from the estimation of the transmission signal is output to the control unit 206 (step S54), and waits until another signal is received (NO in step S51).

Embodiment 2

Figure 6:
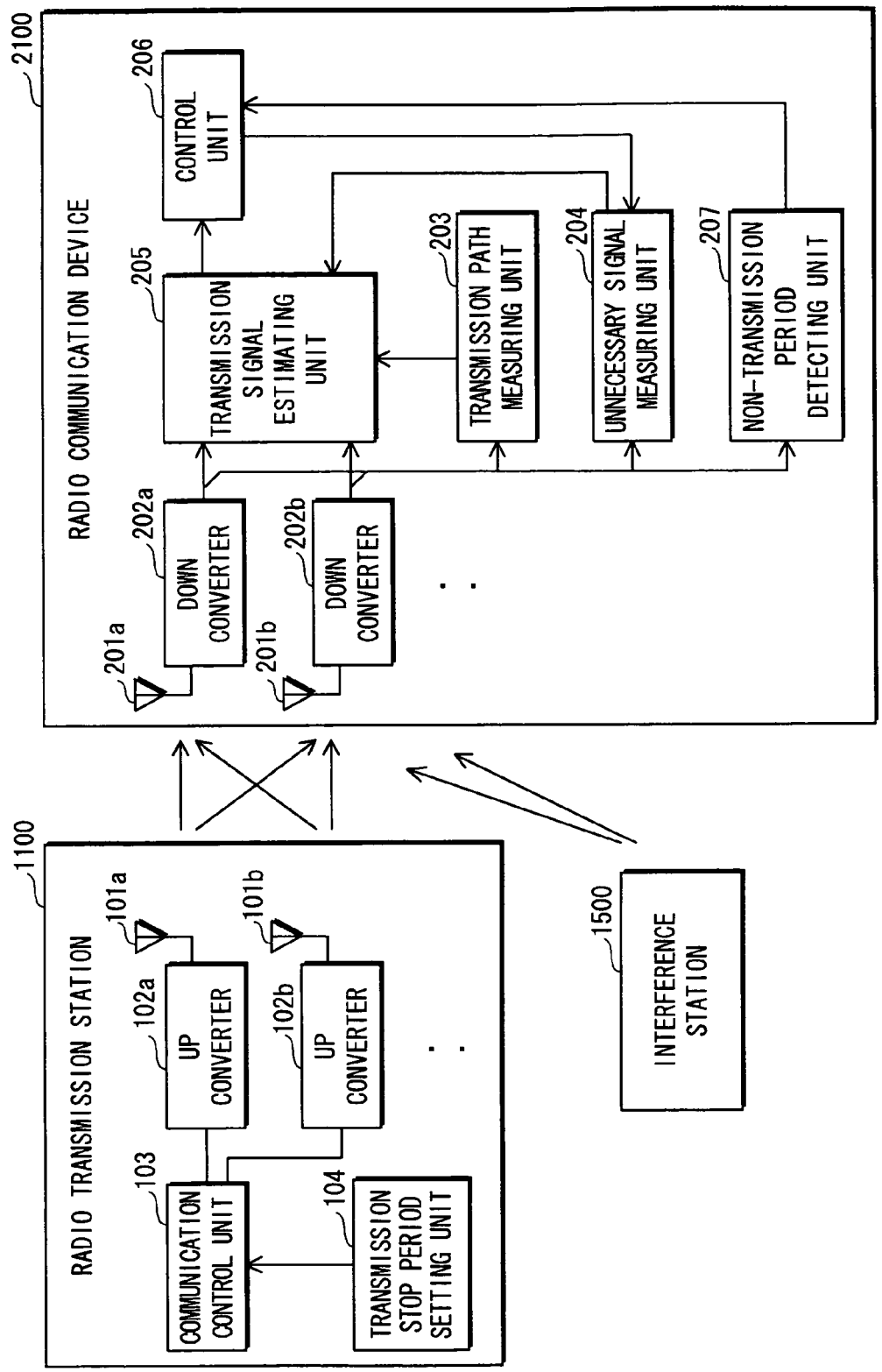
FIG. 6 is a functional block diagram of the radio communication system in Embodiment 2 of the present invention.

Next, another embodiment of the present invention will be described with reference to the attached drawings.
<Construction>
FIG. 6 is a functional block diagram of the radio communication system in Embodiment 2 of the present invention.

The radio communication system shown in FIG. 6 is different from that in Embodiment 1 in that the radio transmission station additionally includes a transmission stop period setting unit 104 and that the radio communication device additionally includes a non-transmission period detecting unit 207. Description of the same components as those in Embodiment 1 will be omitted, and the differences from Embodiment 1 will be focused in the following description.

<Radio Transmission Station>
A radio transmission station 1100 includes the transmission stop period setting unit 104.

The transmission stop period setting unit 104 is a circuit that transmits a predetermined signal and sets a transmission stop period during which the radio transmission station 1106 stops transmitting signals. The transmission stop period is set to, for example, 40 micro seconds. After setting the transmission stop period, the transmission stop period setting unit 104 notifies the communication control unit 103 of the set transmission stop period by outputting a signal.

The communication control unit 103, after the transmission stop period setting unit 104 sets the transmission stop period and outputs a predetermined signal, receives the output predetermined signal and controls the radio communication with a radio communication device 2100 so that any signal is not transmitted during the transmission stop period.
<Radio Communication Device>
As shown in FIG. 6, the radio communication device 2100 includes the non-transmission period detecting unit 207.

The non-transmission period detecting unit 207 is a circuit that receives an input signal and performs a predetermined detection process based on the received signal. The non-transmission period detecting unit 207, each time it receives a signal, performs a process of detecting whether no signal has been transmitted from the radio communication device 1100, based on the received signal, and continues to output a predetermined signal to the control unit 206 while performing the detection process.

It should be noted here that the method for detecting that no signal has been transmitted from the radio communication device 1100 may be achieved by, for example, measuring a received signal and judging whether the training signal, which is contained in a signal transmitted from the radio communication device 1100, is not contained in the received signal. Also, when it is preliminarily known that the amplitude of a signal received from the radio communication device 1100 is within a predetermined range, it is possible to detect whether no signal has been transmitted from the radio communication device 1100, by judging whether the amplitude of a received signal is not within the predetermined range.

The control unit 206 receives a signal from the non-transmission period detecting unit 207, and controls the timing at which the unnecessary signal measuring unit 204 calculates the covariance matrix Ruu, based on the received signal.
<Operation>
The non-transmission period detecting unit 207, each time it receives a signal, performs a predetermined detection process and out puts a predetermined signal to the control unit 206 depending on the detection result. The control unit 206 controls the operation of the unnecessary signal measuring unit 204 based on the signal that is output from the non-transmission period detecting unit 207.

Figure 7:
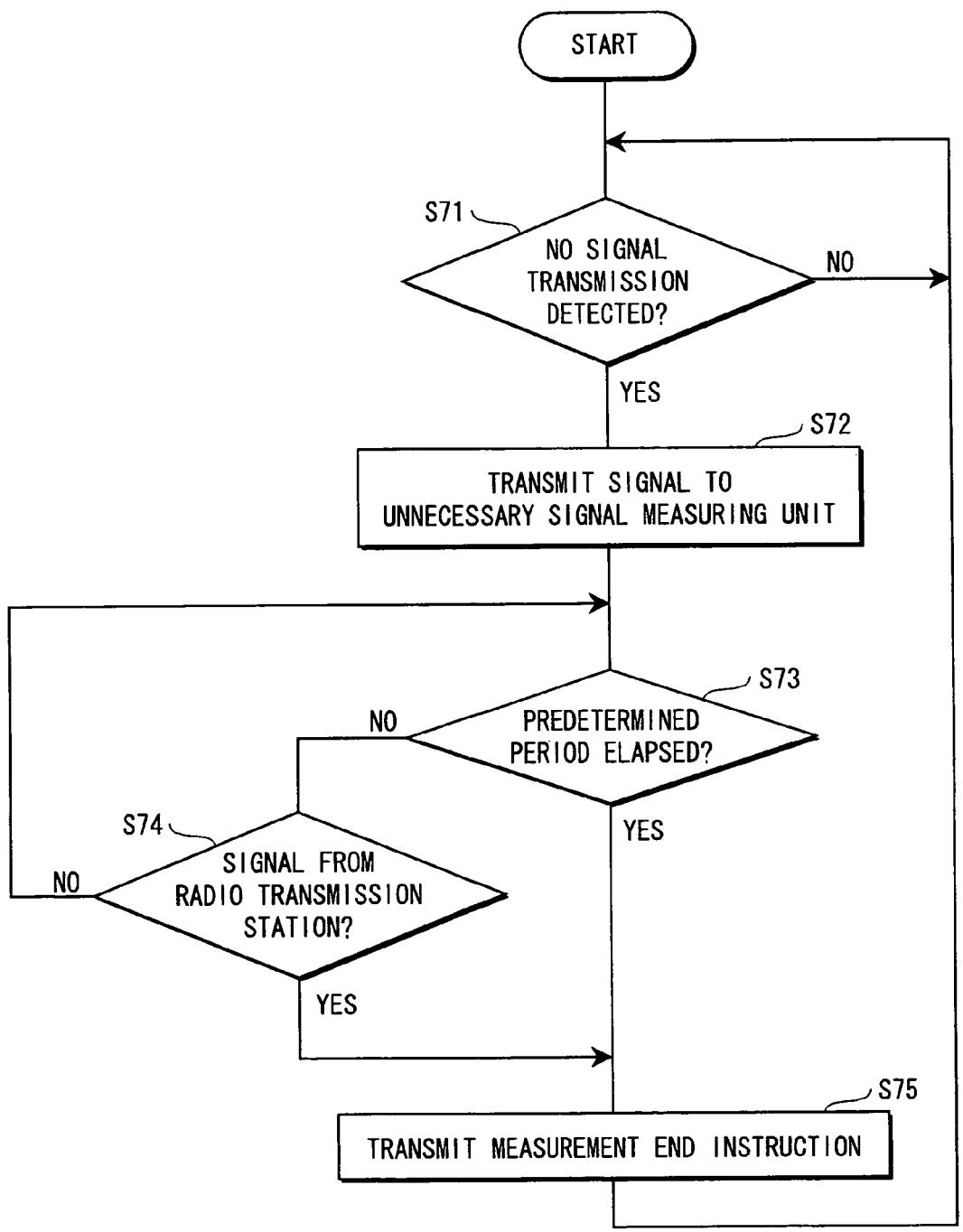
FIG. 7 is a flowchart showing the process of controlling the unnecessary signal measuring unit 204 based on the detection result of the non-transmission period detecting unit 207, performed by the control unit 206.

FIG. 7 is a flowchart showing the process of controlling the unnecessary signal measuring unit 204 based on the detection result of the non-transmission period detecting unit 207, performed by the control unit 206.

As shown in FIG. 7, the control unit 206, upon receiving from the non-transmission period detecting unit 207 a signal indicating that the non-transmission period detecting unit 207 detected that no signal had been transmitted from the radio communication device 1100 (YES in step S71), transmits a measurement start instruction signal to the unnecessary signal measuring unit 204 to cause the unnecessary signal measuring unit 204 to start calculating the covariance matrix Ruu (step S72). When a predetermined period elapses from the transmission of the measurement start instruction signal (YES in step S73), the control unit 206 transmits a measurement end instruction signal to the unnecessary signal measuring unit 204 to cause the unnecessary signal measuring unit 204 to end calculating the covariance matrix Ruu (step S75).

When the predetermined period has not elapsed from the transmission (step S72) of the measurement start instruction signal (NO in step S73): the control unit 206 waits until the predetermined period elapses (step S73) so far as a signal is output from the non-transmission period detecting unit 207 (NO in step S74); and the control unit 206 transmits the measurement end instruction signal to the unnecessary signal measuring unit 204 to cause the unnecessary signal measuring unit 204 to end calculating the covariance matrix Ruu (step S75) if a signal is not output from the non-transmission period detecting unit 207, namely, if the non-transmission period detecting unit 207 fails to detect that no signal has been transmitted from the radio communication device 1100 (YES in step S74).

After causing the unnecessary signal measuring unit 204 to end calculating the covariance matrix Ruu (step S75), the control unit 206 keeps not transmitting the measurement start instruction signal to the unnecessary signal measuring unit 204 so as to keep the unnecessary signal measuring unit 204 in the wait state until the control unit 206 receives a signal from the non-transmission period detecting unit 207 (NO in step S71).

Next, the operation of the radio communication device 1100 will be described.

The radio communication device 1100 includes the transmission stop period setting unit 104, and thus can stop transmitting a signal for a predetermined period by allowing the communication control unit 103 to cause the transmission stop period setting unit 104 to set the transmission stop period.

The transmission stop period setting unit 104 sets the transmission stop period. The setting may be performed periodically, for example, at predetermined intervals, or may be performed at a predetermined time. After performing the setting, the transmission stop period setting unit 104 outputs a predetermined signal, which indicates the transmission stop period, to the communication control unit 103.

Figure 8:
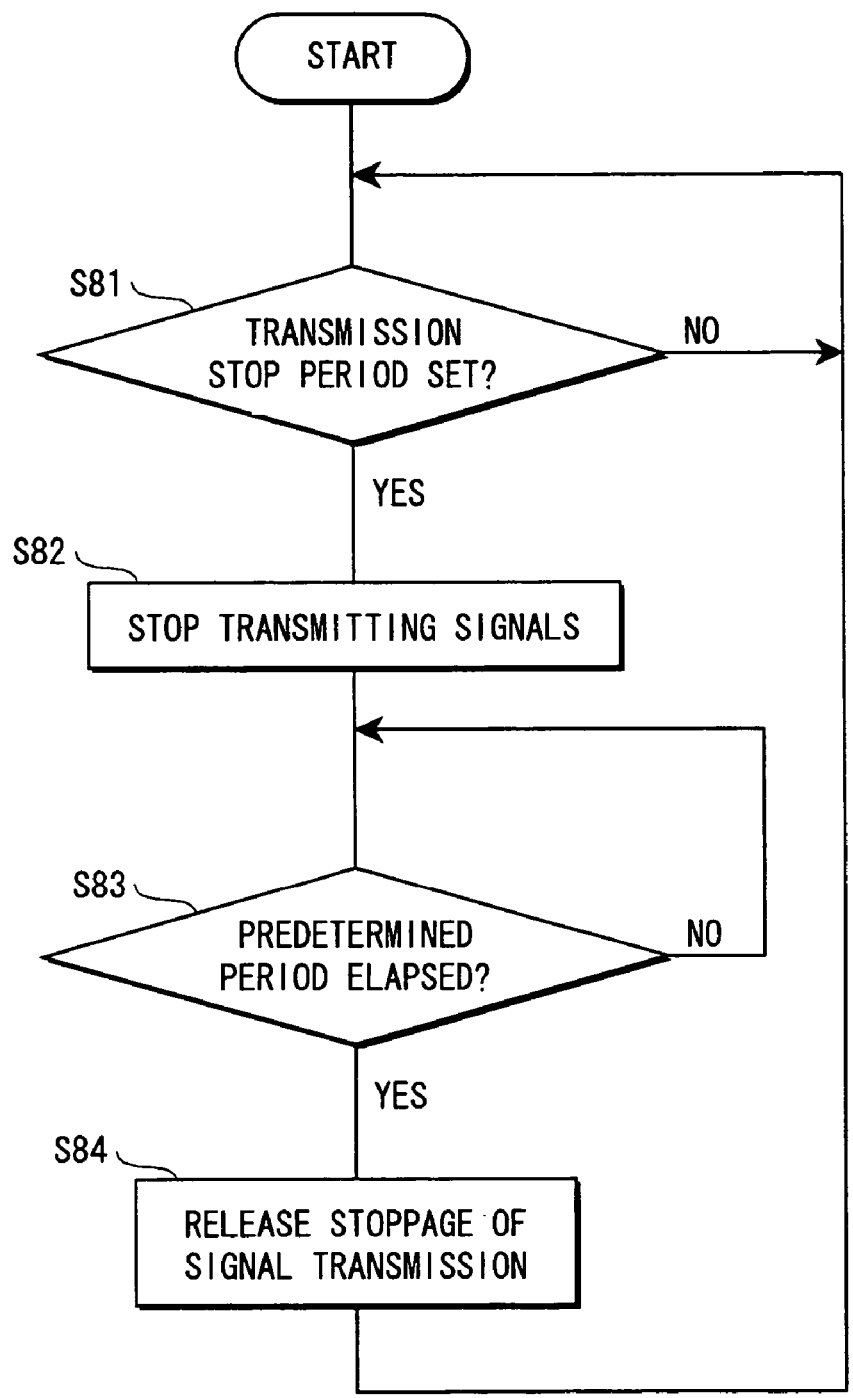
FIG. 8 is a flowchart showing the process of controlling the signal transmission based on the transmission stop period set by the transmission stop period setting unit 104, performed by the communication control unit 103.

FIG. 8 is a flowchart showing the process of controlling the signal transmission based on the transmission stop period set by the transmission stop period setting unit 104, performed by the communication control unit 103.

As shown in FIG. 8, the communication control unit 103, upon receiving from the transmission stop period setting unit 104 a signal indicating the transmission stop period (YES in step S81), stops transmitting signals (step S82), and continues to stop transmitting signals until the transmission stop period elapses (NO in step S83). When the transmission stop period elapses (YES in step S83), the communication control unit 103 releases the stoppage of signal transmission (step S84), and performs a radio communication until it receives from the transmission stop period setting unit 104 a signal indicating the transmission stop period (NO in step S81).

Embodiment 3

Figure 9:
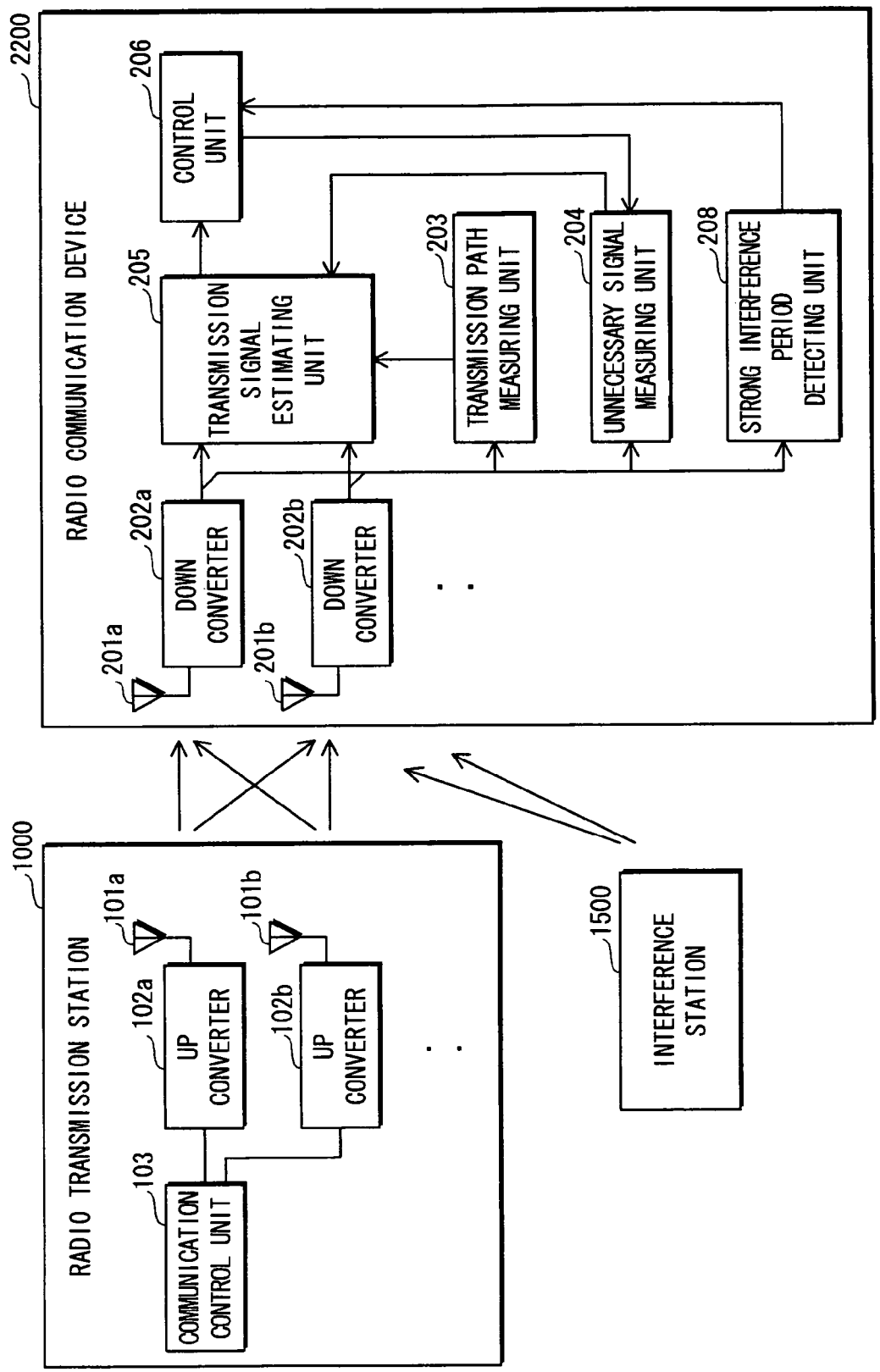
FIG. 9 is a functional block diagram of the radio communication system in Embodiment 3 of the present invention.

Next, another embodiment of the present invention will be described with reference to the attached drawings.
<Construction>
FIG. 9 is a functional block diagram of the radio communication system in Embodiment 3 of the present invention.

The radio communication system shown in FIG. 9 is different from that in Embodiment 1 in that the radio communication device additionally includes a strong interference period detecting unit 208. Description of the same components as those in Embodiment 1 will be omitted, and the differences from Embodiment 1 will be focused in the following description.
<Radio Communication Device>

As shown in FIG. 9, a radio communication device 2200 includes the strong interference period detecting unit 208.

The strong interference period detecting unit 208 is a circuit that receives an input signal and performs a predetermined detection process and transmits a signal, based on the received signal. The strong interference period detecting unit 208, each time it receives a signal, performs a process of detecting whether an influence by a signal component received from the interference station 1500, among the signal components of the received signal, is larger than a predetermined range, based on the received signal, and continues to output a predetermined signal to the control unit 206 while performing the detection process. Here, "an influence by a signal component received from the interference station 1500 is larger than a predetermined range" indicates that, for example, the signal intensity of a signal received from the interference station 1500 is larger than a predetermined value.

The detection is achieved by, for example, judging whether or not the amplitude of the received signal is larger than a predetermined value in a period during which no signal is transmitted from the radio transmission station 1000.

The control unit 206 receives the signal output from the strong interference period detecting unit 208, and controls the timing at which the unnecessary signal measuring unit 204 calculates the covariance matrix Ruu, based on the received signal.
<Operation>

Next, the operation of the radio communication device 2200 will be described.

The strong interference period detecting unit 208, each time it receives a signal, performs a predetermined detection process and outputs a predetermined signal to the control unit 206 depending on the detection result. The control unit 206 controls the operation of the unnecessary signal measuring unit 204 based on the signal output from the strong interference period detecting unit 208 when the unnecessary signal measuring unit 204 calculates the covariance matrix Ruu before a radio communication with the radio transmission station 1000 is started.

Figure 10:
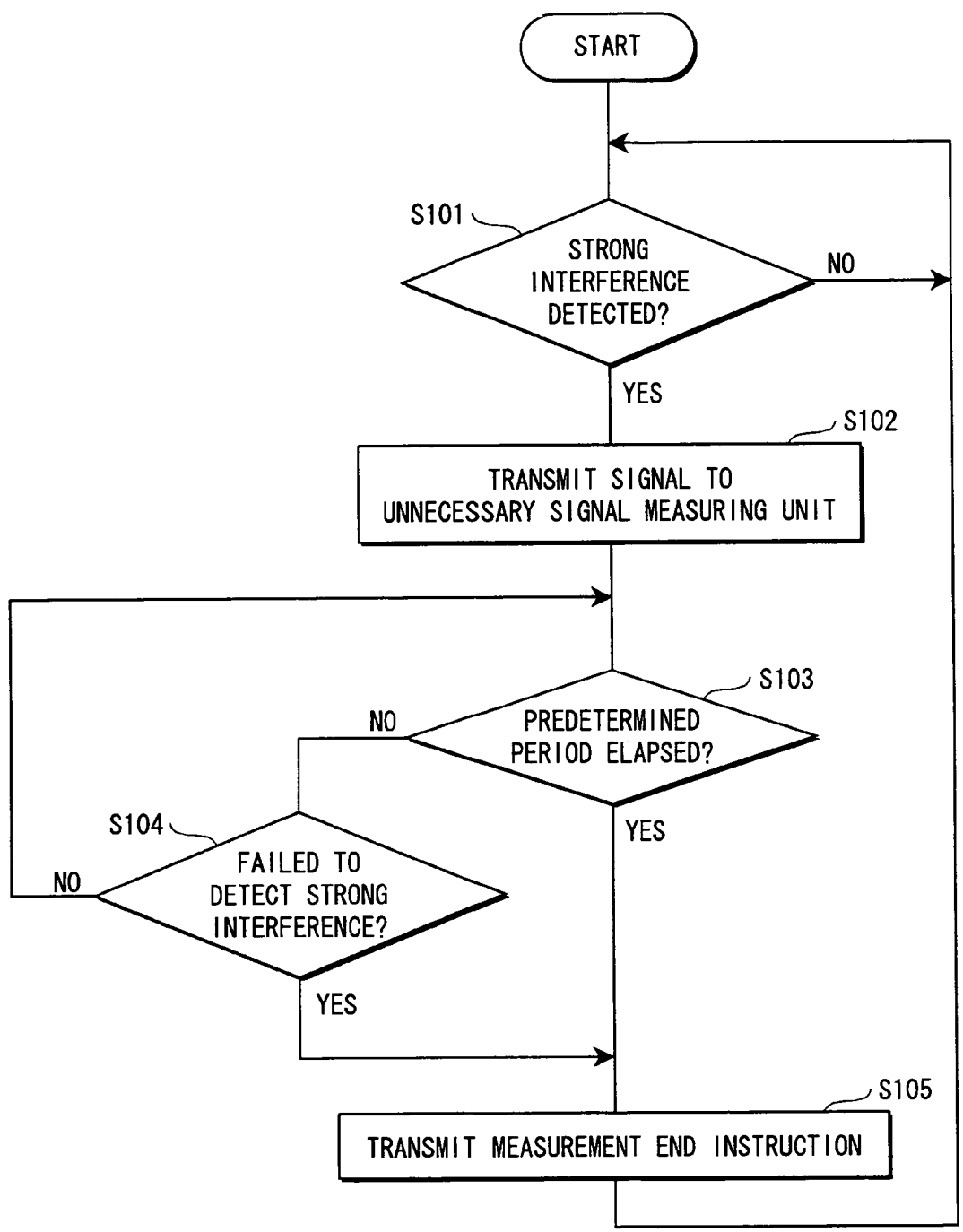
FIG. 10 is a flowchart showing the process of controlling the unnecessary signal measuring unit 204 based on the detection result of the strong interference period detecting unit 208, performed by the control unit 206.

FIG. 10 is a flowchart showing the process of controlling the unnecessary signal measuring unit 204 based on the detection result of the strong interference period detecting unit 208, performed by the control unit 206.

As shown in FIG. 10, the control unit 206, upon receiving from the strong interference period detecting unit 208 a signal indicating that an influence by a signal component received from the interference station 1500 is larger than a predetermined range (YES in step S101), transmits a measurement start instruction signal to the unnecessary signal measuring unit 204 to cause the unnecessary signal measuring unit 204 to start calculating the covariance matrix Ruu (step S102). When a predetermined period elapses from the transmission of the measurement start instruction signal (YES in step S103), the control unit 206 transmits a measurement end instruction signal to the unnecessary signal measuring unit 204 to cause the unnecessary signal measuring unit 204 to end calculating the covariance matrix Ruu (step S105).

When the predetermined period has not elapsed from the transmission of the measurement start instruction signal (NO in step S103): the control unit 206 waits until the predetermined period elapses (step S103) so far as a signal is output from the strong interference period detecting unit 208 (NO in step S104); and the control unit 206 transmits the measurement end instruction signal to the unnecessary signal measuring unit 204 to cause the unnecessary signal measuring unit 204 to end calculating the covariance matrix Ruu (step S105) if a signal is not output from the strong interference period detecting unit 208, namely, if the strong interference period detecting unit 208 fails to detect that an influence by a signal component received from the interference station 1500 is larger than a predetermined range (YES in step S104).

After causing the unnecessary signal measuring unit 204 to end calculating the covariance matrix Ruu, the control unit 206 keeps not transmitting the measurement start instruction signal to the unnecessary signal measuring unit 204 so as to keep the unnecessary signal measuring unit 204 in the wait state until the control unit 206 receives a signal from the strong interference period detecting unit 208 (NO in step S101).

Embodiment 4

Figure 11:
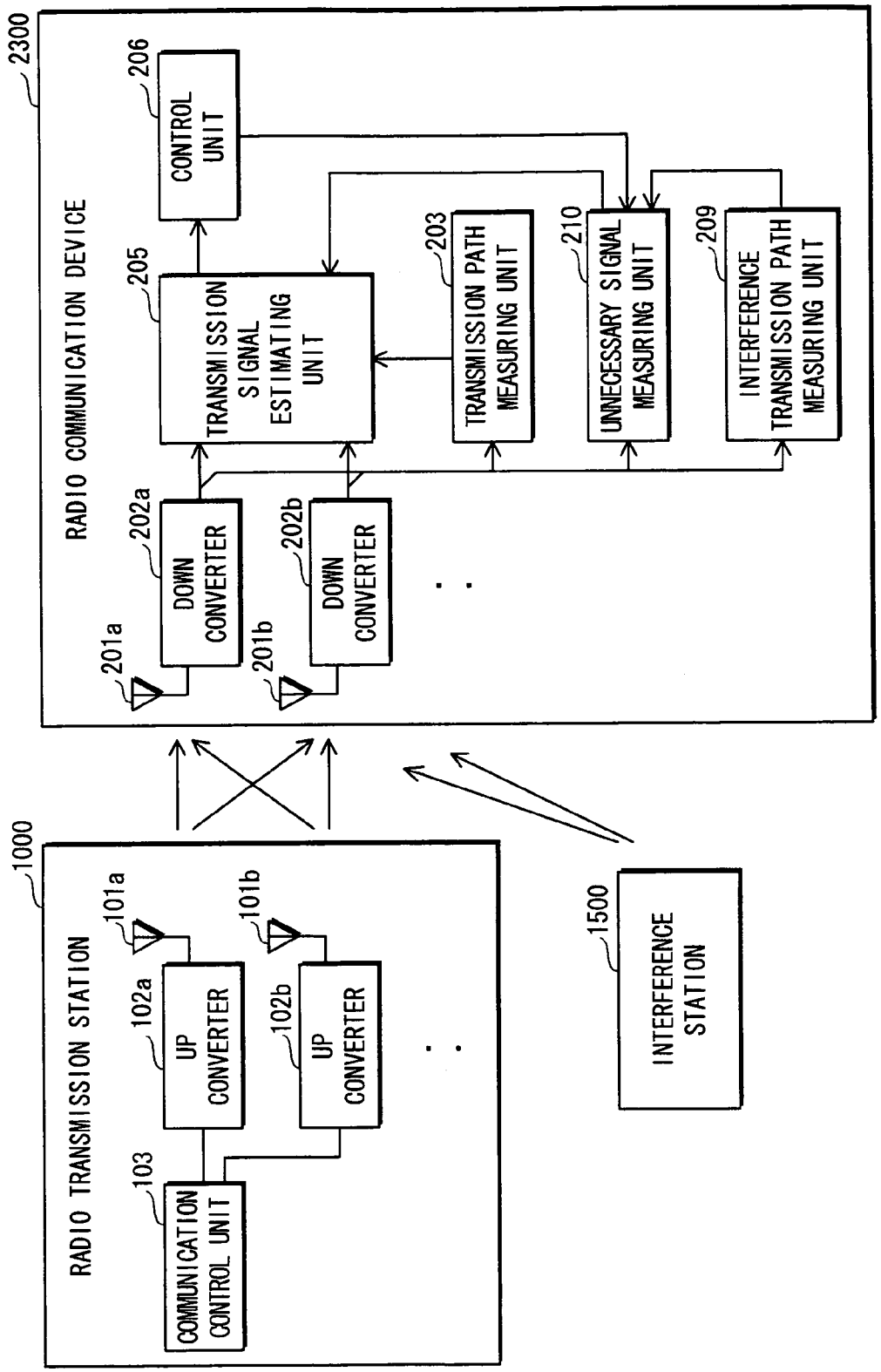
FIG. 11 is a functional block diagram of the radio communication system in Embodiment 4 of the present invention.

Next, another embodiment of the present invention will be described with reference to the attached drawings.
<Construction>
FIG. 11 is a functional block diagram of the radio communication system in Embodiment 4 of the present invention.

The radio communication system shown in FIG. 11 is different from that in Embodiment 1 in that the radio communication device additionally includes an interference transmission path measuring unit 209. It should be noted that the training signal contained in a signal transmitted from the interference station 1500 is known to the radio communication device. Description of the same components as those in Embodiment 1 will be omitted, and the differences from Embodiment 1 will be focused in the following description.

The radio communication device in Embodiment 4 stores the training signal contained in a signal transmitted from the interference station 1500. It is presumed here that a signal transmitted from the interference station 1500 interferes on the same frequency channel as that of a signal transmitted from the radio transmission station 1000, and that the statistical characteristics of signal x transmitted from the interference station 1500 are known. With such conditions, the radio communication device can calculate an interference transmission path matrix for a transmission path connected with the interference station, based on the training signal, and can calculate the covariance matrix Ruu based on the calculated interference transmission path matrix.
<Radio Communication Device>
As shown in FIG. 11, a radio communication device 2300 includes the interference transmission path measuring unit 209 and an unnecessary signal measuring unit 210.

The interference transmission path measuring unit 209 is an integrated circuit that calculates a transmission path matrix that indicates properties of a signal transmission path connected with the interference station 1500, and is provided with a memory for preliminarily storing a signal with a predetermined pattern contained in a signal transmitted from the interference station 1500. After receiving a signal, the interference transmission path measuring unit 209 extracts the signal with the predetermined pattern from the received signal, and obtains an interference transmission path matrix G by calculating a correlation between the signal with the predetermined pattern and the preliminarily stored signal. The interference transmission path measuring unit 209 outputs the obtained interference transmission path matrix G to the unnecessary signal measuring unit 210.

Upon receiving the interference transmission path matrix G output from the interference transmission path measuring unit 209, the unnecessary signal measuring unit 210 calculates the covariance matrix Ruu in accordance with [Expression 7]. It should be noted here that in regards with [Expression 7], covariance matrix Rxx can be obtained from the statistical characteristics of "x".
<Operation>
Next, the operation of the radio communication device 2300 will be described.

Figure 12:
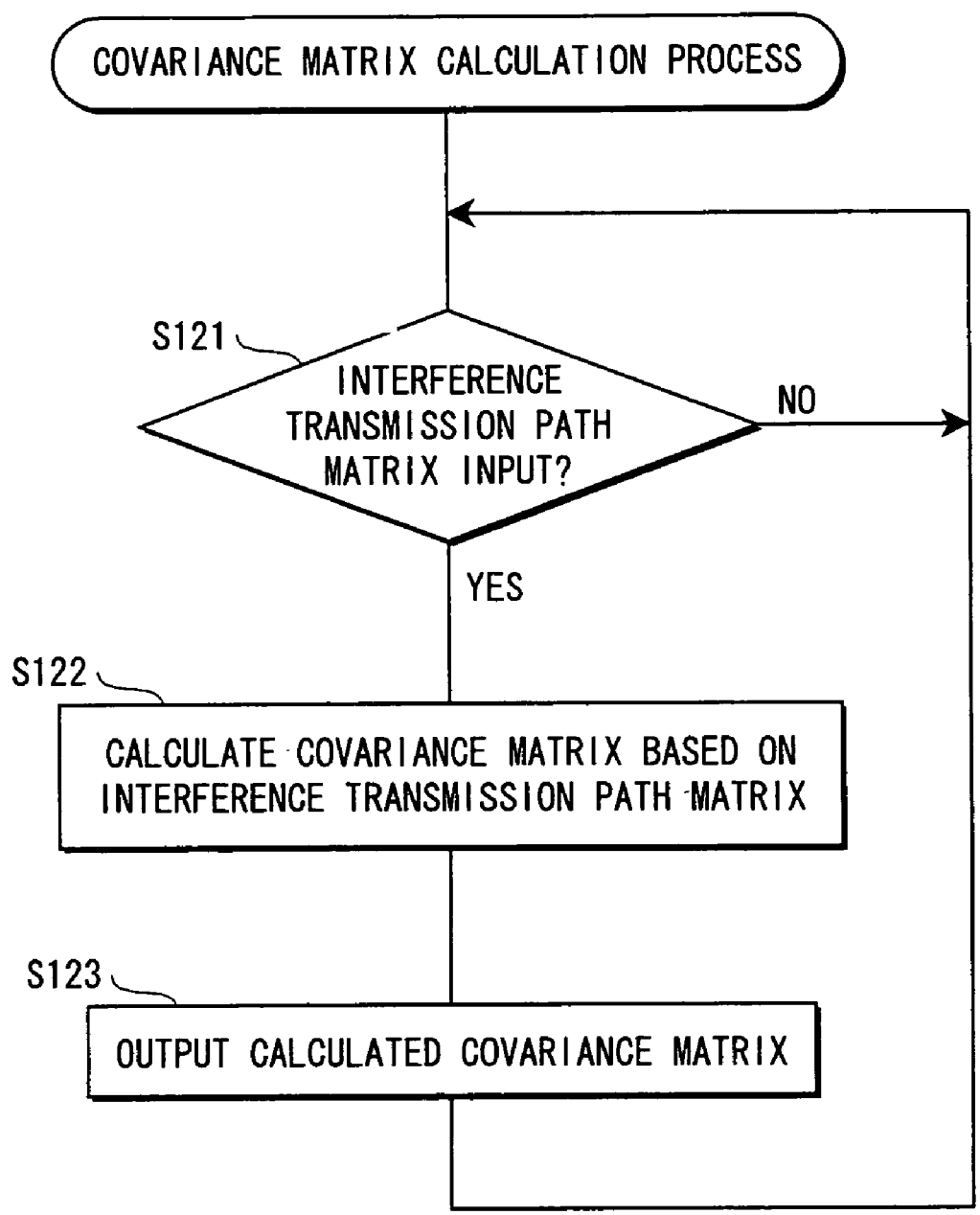
FIG. 12 is a flowchart showing the process of calculating the covariance matrix Ruu of the unnecessary signal, performed by the unnecessary signal measuring unit 210.

FIG. 12 is a flowchart showing the process of calculating the covariance matrix Ruu of the unnecessary signal, performed by the unnecessary signal measuring unit 210.

As shown in FIG. 12, upon receiving the interference transmission path matrix G from the interference transmission path measuring unit 209 (YES in step S121), the unnecessary signal measuring unit 210 calculates the covariance matrix Ruu in accordance with [Expression 7] (step S122). The unnecessary signal measuring unit 210 outputs the calculated covariance matrix Ruu to the transmission signal estimating unit 205 (step S123). After this, each time it receives the interference transmission path matrix G (step S121), the unnecessary signal measuring unit 210 calculates and outputs the covariance matrix Ruu.

With this construction, the radio communication device 2300 can calculate the covariance matrix Ruu faster and more accurately than with the construction in which the unnecessary signal is received and the covariance matrix Ruu is calculated by calculating a correlation.

Embodiment 5

Figure 13:
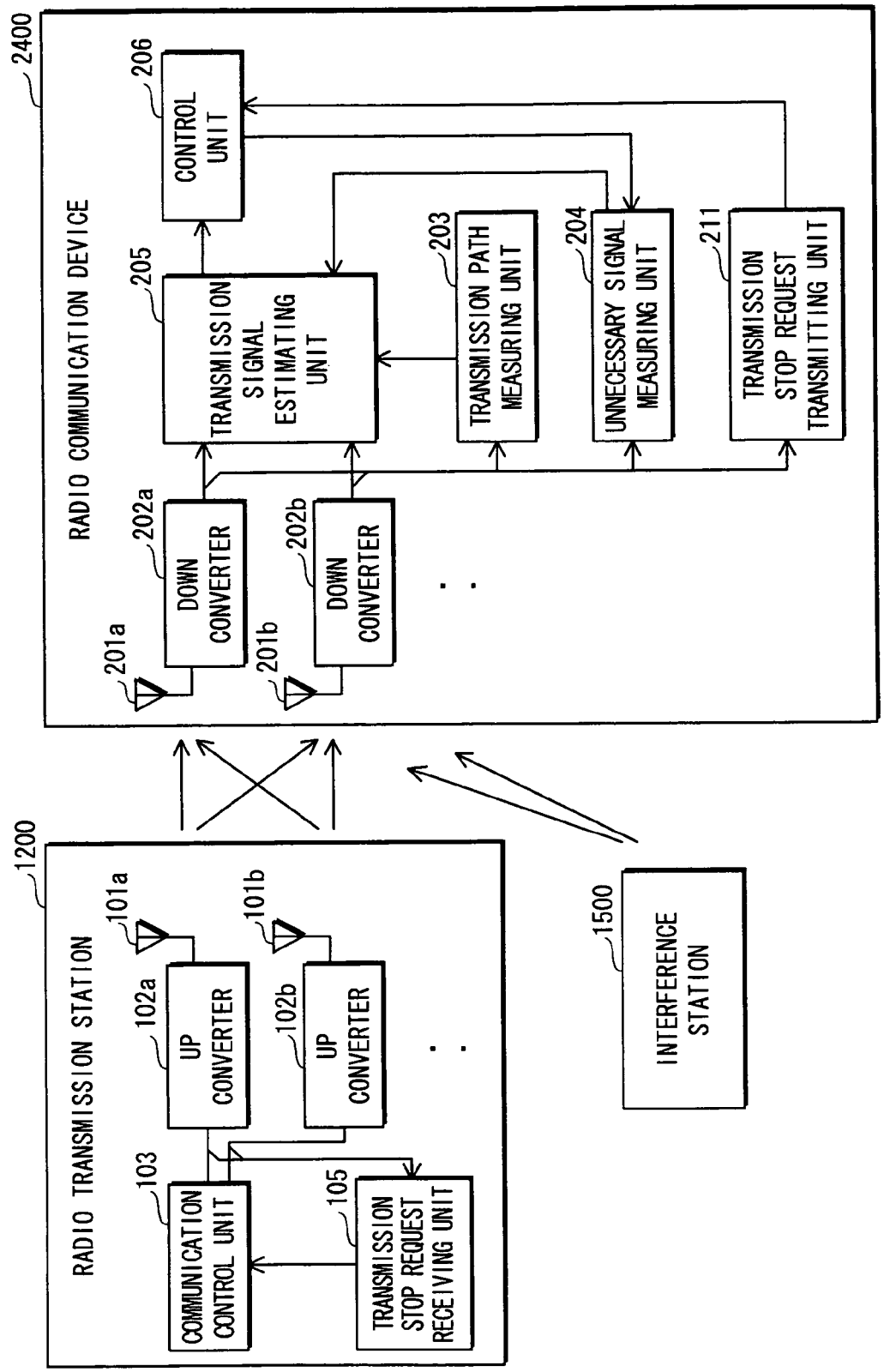
FIG. 13 is a functional block diagram of the radio communication system in Embodiment 5 of the present invention.

Next, another embodiment of the present invention will be described with reference to the attached drawings.
<Construction>
FIG. 13 is a functional block diagram of the radio communication system in Embodiment 5 of the present invention.

Figure 18:
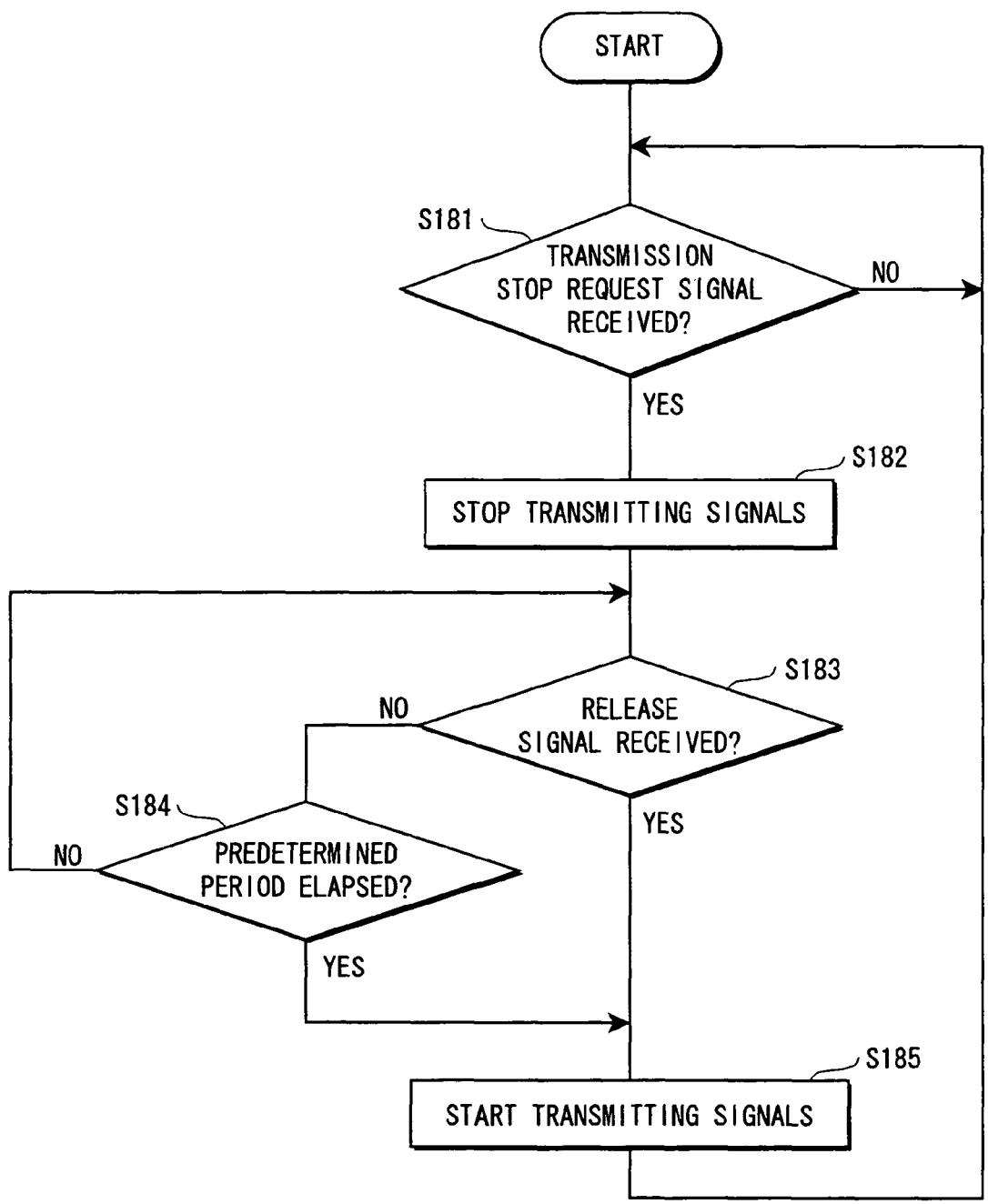
FIG. 18 is a flowchart showing the process of controlling the signal transmission based on the release signal, performed by the communication control unit 103 of the radio transmission station 1200.

The radio communication system shown in FIG. 13 is different from that in Embodiment 1 in that the radio communication device additionally includes a transmission stop request transmitting unit 211, and that the radio transmission station additionally includes a transmission stop request receiving unit 105. Description of the same components as those in Embodiment 1 will be omitted, and the differences from Embodiment 1 will be focused in the following description.
<Radio Communication Device>
As shown in FIG. 18, a radio communication device 2400 includes the transmission stop request transmitting unit 211.

The transmission stop request transmitting unit 211 is a circuit that performs signal transmission/reception, and transmits a transmission stop request signal to a radio transmission station 1200, when instructed to do so by the control unit 206. The transmission stop request signal is a signal that requests the radio transmission station 1200 to stop transmitting signals. Signals are transmitted via antennas. However, the radio communication device 2400 is provided with, in addition to the antennas 201, an antenna that is dedicated to transmitting the transmission stop request signal. However, not limited to this construction, a dedicated antenna may not be provided, and the transmission stop request signal may be transmitted via the antennas 201. After transmitting the transmission stop request signal to the radio transmission station 1200, the transmission stop request transmitting unit 211 outputs a predetermined signal, which indicates that the transmission stop request signal was transmitted, to the control unit 206.

The transmission stop request transmitting unit 211 may also transmit a transmission stop request signal including stop period information or transmission resumption timing information to the radio transmission station 1200, when instructed to do so by the control unit 206, where the stop period information indicates a period during which signal transmission to the radio transmission station 1200 is stopped, and the transmission resumption timing information indicates a timing at which the signal transmission to the radio transmission station 1200 is resumed. The stop period information is set to, for example, 40 micro seconds.

The transmission stop request transmitting unit 211 may also transmit a release signal that requests to release the stoppage of the signal transmission to the radio transmission station 1200, when instructed to do so by the control unit 206

The control unit 206 transmits to the transmission stop request transmitting unit 211 a predetermined signal that requests it to transmit the transmission stop request signal to the radio transmission station 1200. And upon receiving from the transmission stop request transmitting unit 211 a signal indicating that the transmission stop request transmitting unit 211 transmitted the transmission stop request signal, the control unit 206 controls the unnecessary signal measuring unit 204 to calculate the covariance matrix Ruu.

The control unit 206 may also control the unnecessary signal measuring unit 204 to transmit the transmission stop request signal including the stop period information or the transmission resumption timing information to the radio transmission station 1200.

After controlling the unnecessary signal measuring unit 204 to calculate the covariance matrix Ruu, the control unit 206 may instruct the transmission stop request transmitting unit 211 to transmit the release signal to the radio transmission station 1200.

<Radio Transmission Station>

As shown in FIG. 13, the radio transmission station 1200 includes the transmission stop request receiving unit 105.

The transmission stop request receiving unit 105 is a circuit that performs a predetermined process upon receiving a signal. More specifically, upon receiving a signal, the transmission stop request receiving unit 105 judges whether or not the received signal includes the transmission stop request signal, and if it includes the transmission stop request signal, outputs to the communication control unit 103 a signal indicating that it received the transmission stop request signal.

Upon receiving the release signal, the transmission stop request receiving unit 105 outputs to the communication control unit 103 a signal indicating that it received the release signal.

Upon receiving the predetermined signal from the transmission stop request receiving unit 105, the communication control unit 103 stops transmitting signals for a predetermined period and controls the radio communication with the radio communication device 2400. If the received transmission stop request signal includes the stop period information or the transmission resumption timing information, the communication control unit 103 controls the period during which the signal transmission is stopped, in accordance with the stop period information or the transmission resumption timing information. Upon receiving from the transmission stop request receiving unit 105 the predetermined signal indicating that the release signal was received, the communication control unit 103 releases the stoppage of signal transmission.

<Operation>

Next, the operation of the radio communication device 2400 will be described.

Figure 14:
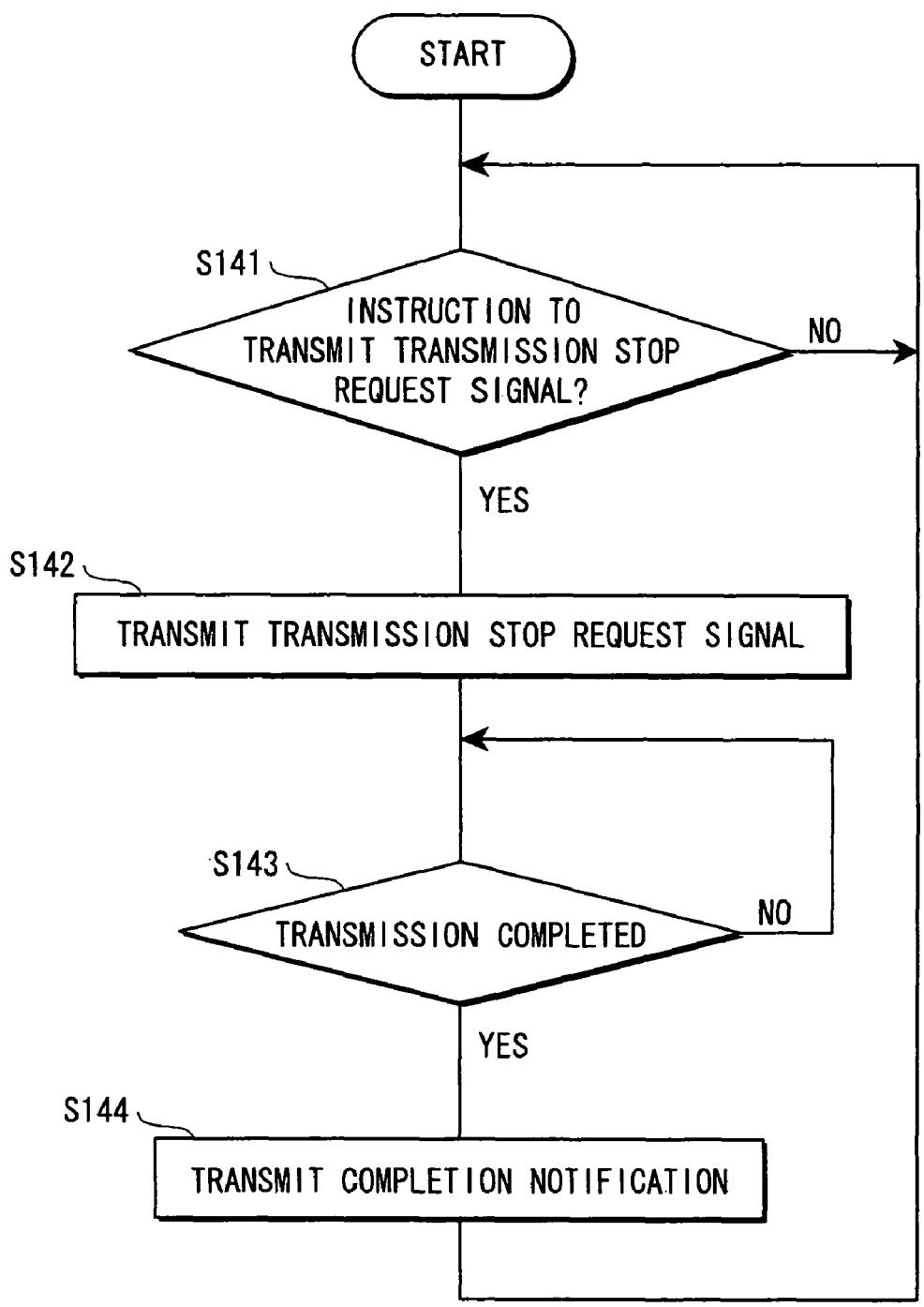
FIG. 14 is a flowchart showing the process of transmitting the transmission stop request signal, performed by the transmission stop request transmitting unit 211.

FIG. 14 is a flowchart showing the process of transmitting the transmission stop request signal, performed by the transmission stop request transmitting unit 211.

As shown in FIG. 14, upon receiving from the control unit 206 an instruction to transmit the transmission stop request signal (YES in step S141), the transmission stop request transmitting unit 211 starts transmitting the transmission stop request signal to the radio transmission station 1200 (step S142), continues the transmission until it is completed (NO in step S143), and if the transmission is completed (YES in step S143), outputs to the control unit 206 a predetermined signal that notifies that the transmission was completed (step S144). After this, each time it receives an instruction to transmit the transmission stop request signal (step S141), the transmission stop request transmitting unit 211 transmits the transmission stop request signal to the radio transmission station 1200.

Next, the operation of the control unit 206 will be described.

Figure 15:
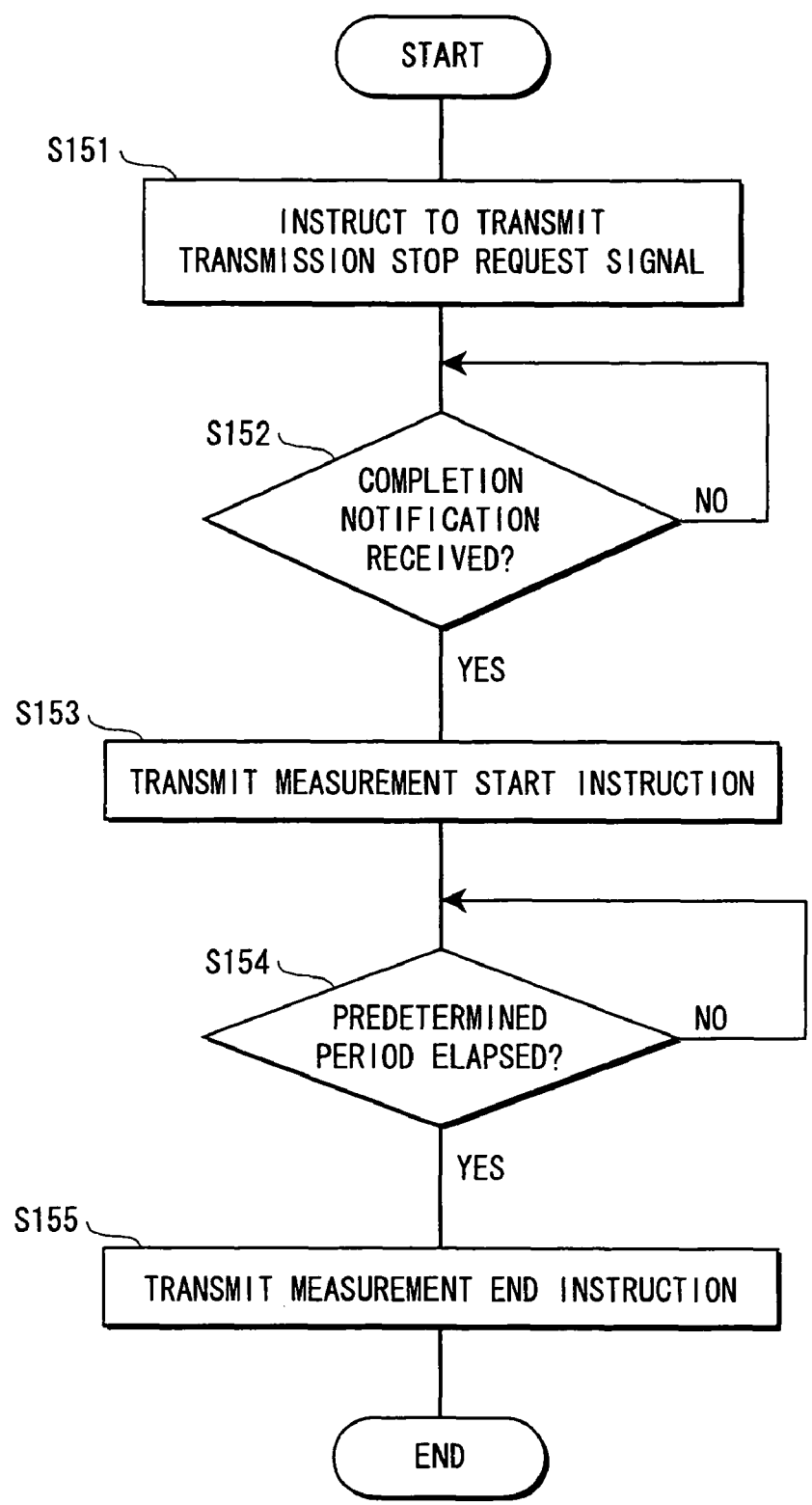
FIG. 15 is a flowchart showing the process of controlling the unnecessary signal measuring unit 204, performed by the control unit 206 in Embodiment 5.

FIG. 15 is a flowchart showing the process of controlling the unnecessary signal measuring unit 204, performed by the control unit 206 in Embodiment 5.

As shown in FIG. 15, before causing the unnecessary signal measuring unit 204 to calculate the covariance matrix Ruu, the control unit 206 instructs the transmission stop request transmitting unit 211 to transmit the transmission stop request signal (step S151), and waits until it receives from the transmission stop request transmitting unit 211 a signal indicating that the transmission stop request signal was transmitted to the radio transmission station 1200 (NO in step S152). Upon receiving a signal indicating that the transmission stop request signal was transmitted to the radio transmission station 1200 (YES in step S152), the control unit 206 transmits a measurement start instruction signal to the unnecessary signal measuring unit 204 (step S153).

If the transmission stop request signal transmitted to the radio transmission station 1200 includes the stop period information or the transmission resumption timing information, the control unit 206 causes the unnecessary signal measuring unit 204 to calculate the covariance matrix Ruu during the period indicated by the stop period information or the transmission resumption timing information. If the transmission stop request signal transmitted to the radio transmission station 1200 does not include the stop period information or the transmission resumption timing information, the control unit 206 causes the unnecessary signal measuring unit 204 to calculate the covariance matrix Ruu until a predetermined period elapses (step S154).

When the predetermined period has elapsed or when the period or the timing indicated by the stop period information or the transmission resumption timing information has elapsed (YES in step S154), the control unit 206 transmits the measurement end instruction signal to the unnecessary signal measuring unit 204 (step S155).

Next, the operation of the radio transmission station 1200 will be described.

Figure 16:
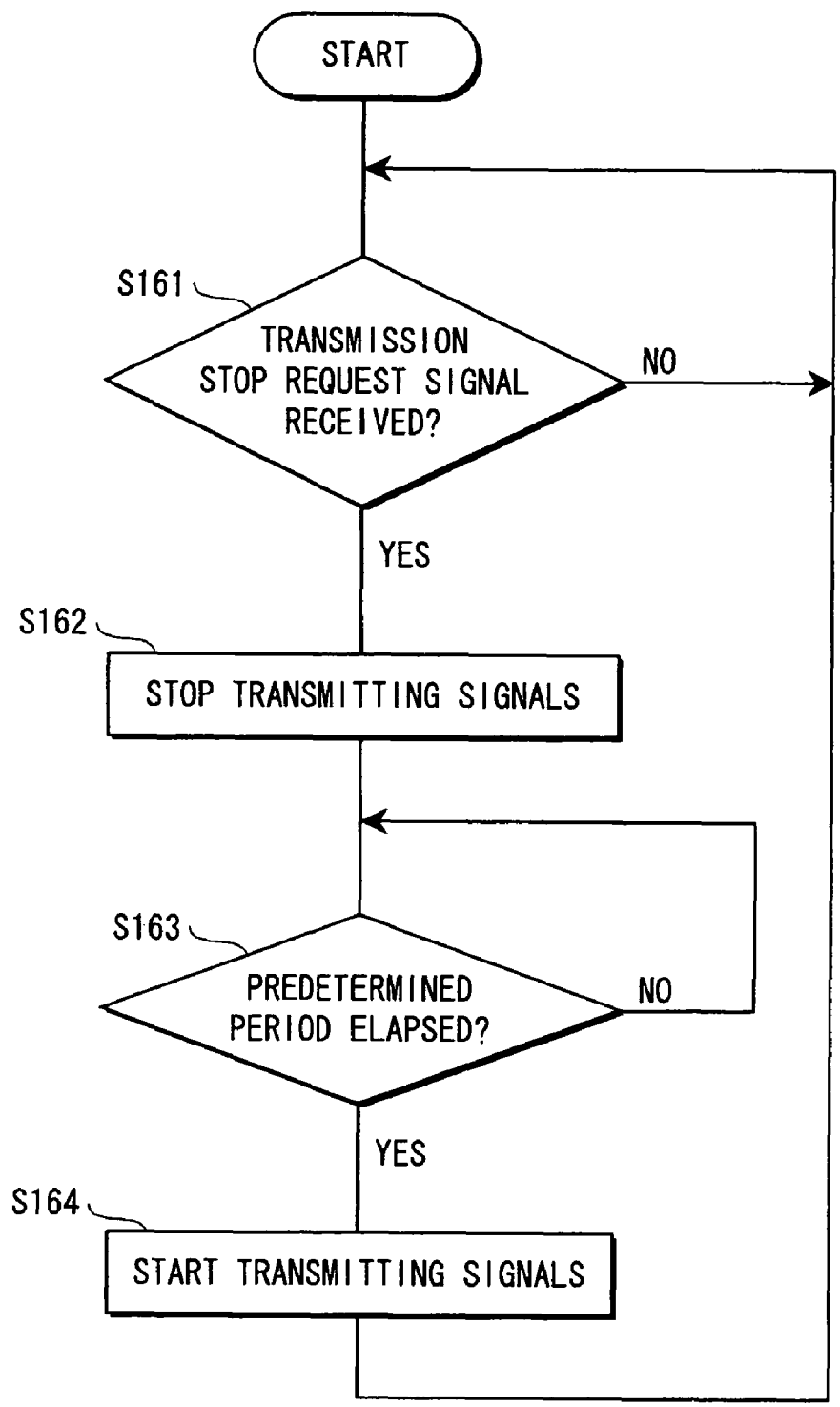
FIG. 16 is a flowchart showing the process of controlling the signal transmission based on the transmission stop request signal, performed by the communication control unit 103 of the radio transmission station 1200.

FIG. 16 is a flowchart showing the process of controlling the signal transmission based on the transmission stop request signal, performed by the communication control unit 103 of the radio transmission station 1200.

As shown in FIG. 16, upon receiving from the transmission stop request receiving unit 105 a signal indicating that the transmission stop request signal was received (YES in step S161), the communication control unit 103 controls the radio communication with the radio communication device 2400 to stop transmitting signals (step S162).

The communication control unit 103 continues to stop transmitting signals until a predetermined period elapses (NO in step S163).

When the predetermined period has elapsed (YES in step S163), the communication control unit 103 starts transmitting signals and resumes the radio communication with the radio communication device 2400 (step S164). The communication control unit 103 continues the radio communication with the radio communication device 2400 until the transmission stop request receiving unit 105 receives the transmission stop request signal again (NO in step S161).

If the transmission stop request signal includes the stop period information or the transmission resumption timing information, the communication control unit 103 performs a control such that the signal transmission is stopped during the period indicated by the stop period information or the transmission resumption timing information.

In the above description, it is explained that the transmission stop request signal may include the stop period information or the transmission resumption timing information. However, not limited to this, the radio communication device 2400 may transmit the transmission stop request signal to the radio transmission station 1200 to cause the radio transmission station 1200 to stop transmitting signals, and then may transmit the release signal to the radio transmission station 1200 to cause the radio transmission station 1200 to resume the signal transmission.

Next provided is the description of the operation of the radio communication device 2400 in the case where the release signal is transmitted to the radio transmission station 1200 to cause the radio transmission station 1200 to resume the signal transmission.

Figure 17:
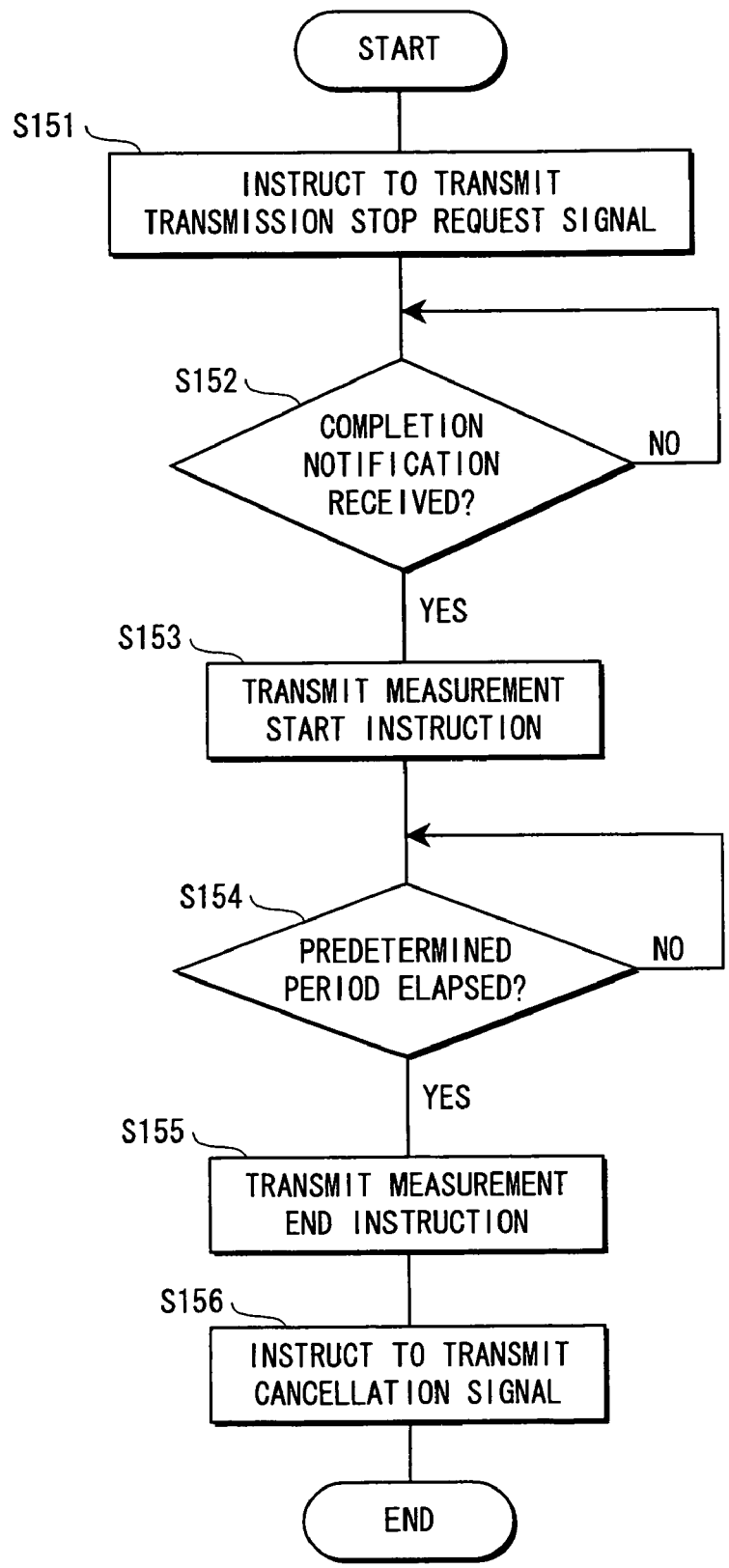
FIG. 17 is a flowchart showing the process in the case where the release signal is transmitted, performed by the control unit 206. Description of the same steps as those in FIG. 15 is omitted, where the same steps are indicated by the same reference signs.

FIG. 17 is a flowchart showing the process in the case where the release signal is transmitted, performed by the control unit 206. Description of the same steps as those in FIG. 15 will be omitted, where the same steps are indicated by the same reference signs.

As shown in FIG. 17, the control unit 206 causes the unnecessary signal measuring unit 204 to calculate the covariance matrix Ruu through steps S151 to S155, which are the same as those shown in FIG. 15, and then instructs the radio transmission station 1200 to transmit the release signal (step S156).

Next, the operation of the radio transmission station 1200 when receiving the release signal will be described.

FIG. 18 is a flowchart showing the process of controlling the signal transmission based on the release signal, performed by the communication control unit 103 of the radio transmission station 1200.

As shown in FIG. 18, the communication control unit 103, upon receiving from the transmission stop request receiving unit 105 a signal indicating that the transmission stop request signal was received (YES in step S181), the communication control unit 103 controls the radio communication with the radio communication device 2400 to stop transmitting signals (step S182).

If it receives the release signal from the transmission stop request receiving unit 105 after stopping the signal transmission (YES in step S183), the communication control unit 103 starts transmitting signals and resumes the radio communication with the radio communication device 2400 (step S185). If it has not received the release signal from the transmission stop request receiving unit 105 (NO in step S183): the communication control unit 103 continues to judge whether or not it has received the release signal (step S183) until a predetermined period elapses (NO in step S184); and the communication control unit 103 resumes the radio communication with the radio communication device 2400 (step S185) if the predetermined period has elapsed (YES in step S184). The communication control unit 103 continues the radio communication with the radio communication device 2400 until the transmission stop request receiving unit 105 receives the transmission stop request signal again (NO in step S181).

Embodiment 6

Figure 19:
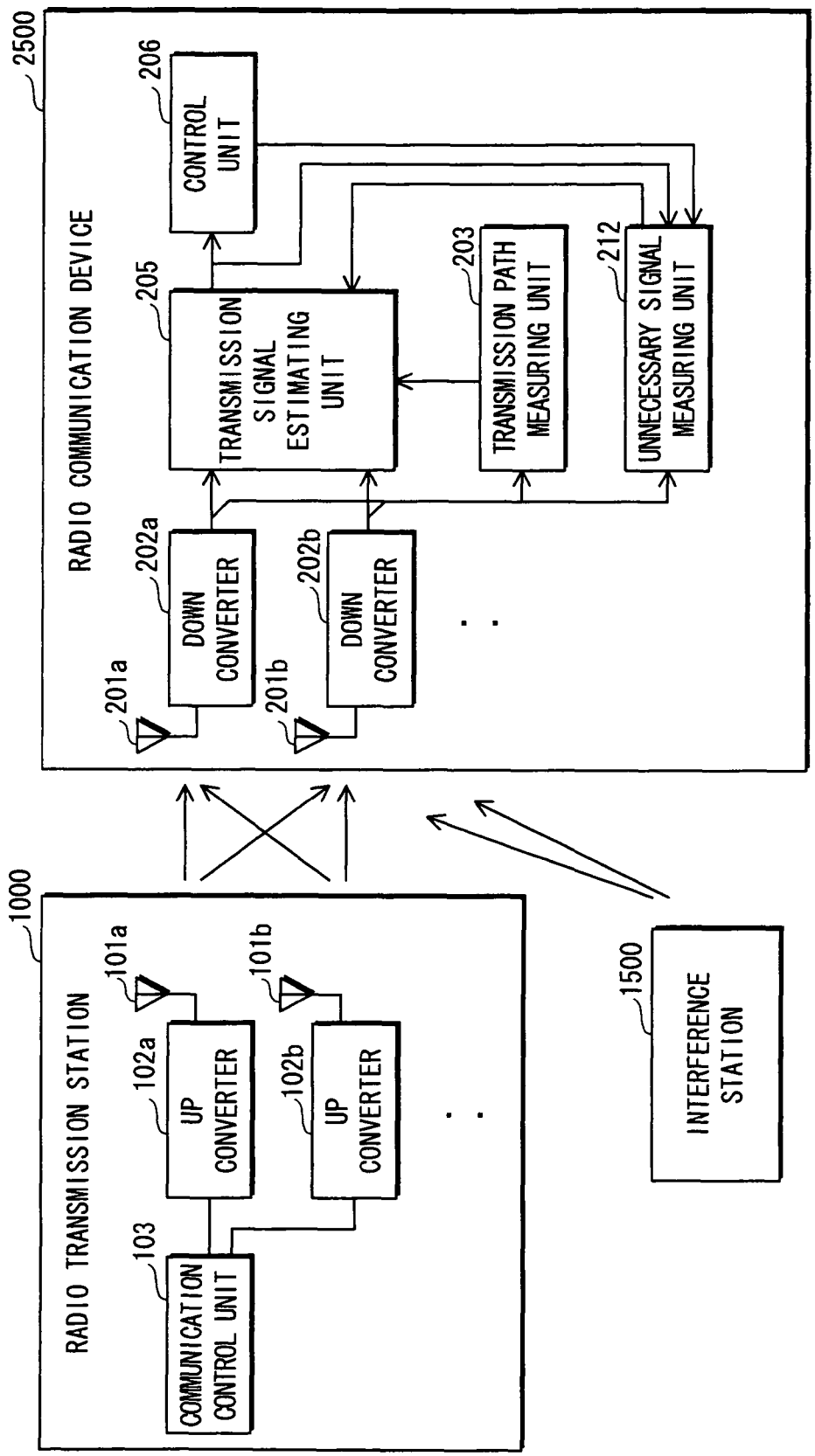
FIG. 19 is a functional block diagram of the radio communication system in Embodiment 6 of the present invention.

Next, another embodiment of the present invention will be described with reference to the attached drawings.
<Construction>
FIG. 19 is a functional block diagram of the radio communication system in Embodiment 6 of the present invention.

The radio communication system shown in FIG. 19 is different from that in Embodiment 1 in that the radio communication device includes an unnecessary signal measuring unit 212 in place of the unnecessary signal measuring unit 204.

The unnecessary signal measuring unit 212 is different from the unnecessary signal measuring unit 204 in Embodiment 1 in that it receives transmission path matrix H from the transmission path measuring unit 203 and receives estimator v for a transmission signal from the transmission stop request receiving unit 105. The received values "H" and "v" are stored in a memory provided in the unnecessary signal measuring unit 212. Each time a value of the transmission path matrix H or the estimator v is input, the unnecessary signal measuring unit 212 overwrites a corresponding value in the memory with the newly input value. The unnecessary signal measuring unit 212 calculates the covariance matrix Ruu in accordance with a predetermined expression. The predetermined expression will be described later.

The unnecessary signal measuring unit 212 is further provided with a detection circuit that detects a modulation level of a multilevel modulation of a received signal. The modulation level of a multilevel modulation is detected by identifying the modulation method of the received signal. After detecting the modulation level, the unnecessary signal measuring unit 212 outputs to the control unit 206 a signal indicating the detected modulation level.

Here, the predetermined expression will be described. The unnecessary signal measuring unit 212 obtains an unnecessary signal in accordance with the following [Expression 15], where "u" represents the unnecessary signal, and "r" represents the received signal.

$$u = r - Hd \quad \text{[Expression 15]}$$

The value "d" is a discrete value that is obtained by determining the estimator "v". During modulation, the transmission signal takes on a discrete value. It is thus presumed that the estimator is also a discrete value.

The covariance matrix Ruu is obtained by performing a calculation "E[uu$^H$]" with the value of unnecessary signal "u" obtained above.

Here, [Expression 15] will be explained. The received signal r is represented by the following [Expression 16].

$$r = Hs + u \quad \text{[Expression 16]}$$

[Expression 15] is then obtained by using, as the value "s", the determination value "d" of the estimator "v" for a transmission signal.

The control unit 206 may receive a signal indicating the modulation level of a multilevel modulation and control the operation timing of the unnecessary signal measuring unit 212 based on the modulation level.

<Operation>

Next, the operation of a radio communication device 2500 will be described.

Figure 20:
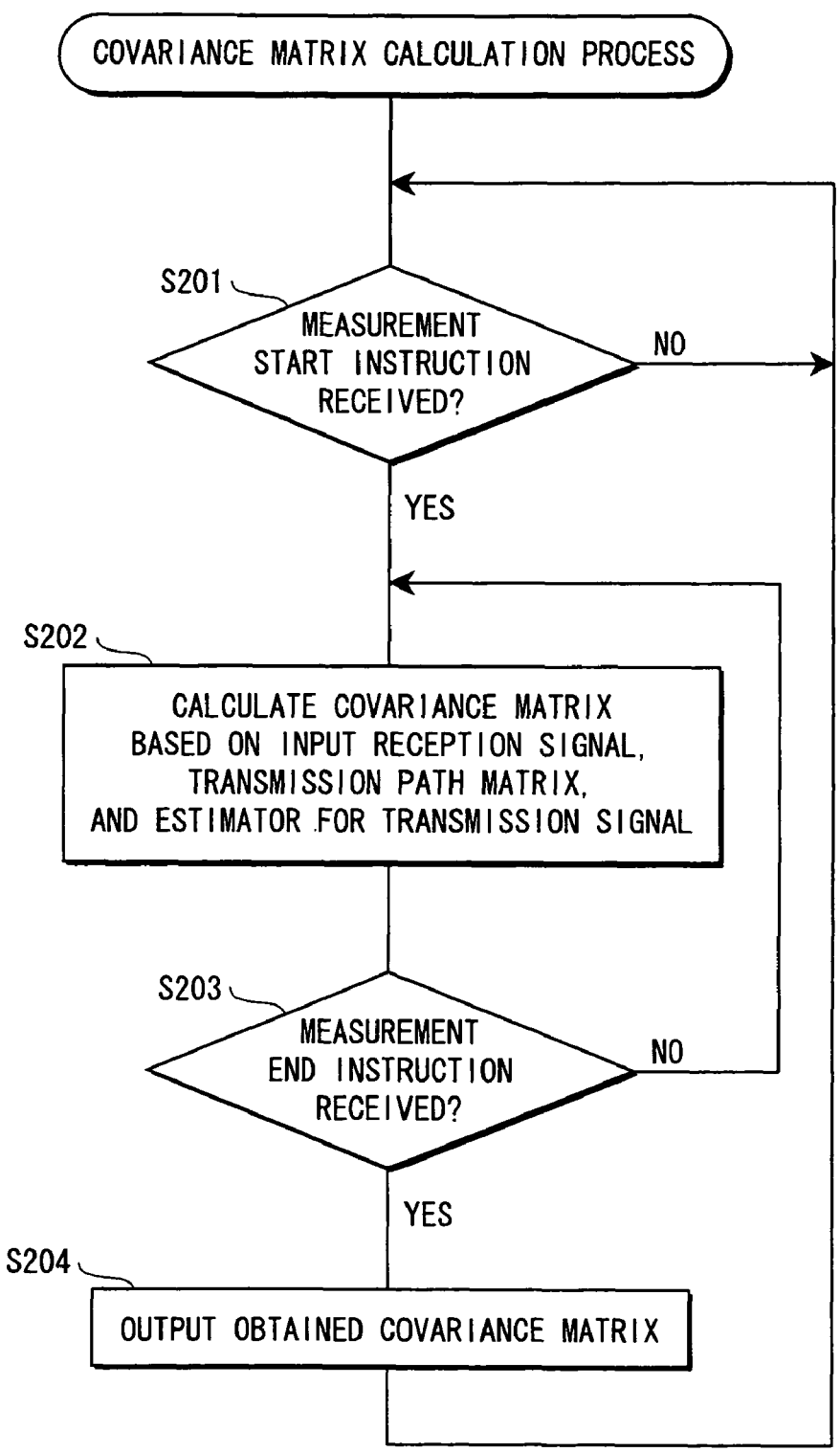
FIG. 20 is a flowchart showing the process of calculating the covariance matrix Ruu of the unnecessary signal, performed by the unnecessary signal measuring unit 212.

FIG. 20 is a flowchart showing the process of calculating the covariance matrix Ruu of the unnecessary signal, performed by the unnecessary signal measuring unit 212.

As shown in FIG. 20, upon receiving a measurement start instruction signal from the control unit 206 (YES in step S201), the unnecessary signal measuring unit 212 calculates the covariance matrix Ruu of the unnecessary signal in accordance with a predetermined expression, based on the reception signal, transmission path matrix H, and estimator v for a transmission signal (step S202). The unnecessary signal measuring unit 212 continues the calculation and outputting of the covariance matrix Ruu (step S202) until it receives the measurement end instruction signal from the control unit 206 (NO in step S203). Upon receiving the measurement end instruction signal from the control unit 206 (YES in step S203), the unnecessary signal measuring unit 212 obtains a covariance matrix Ruu by completing the calculation that was being performed when the measurement end instruction signal was received, and outputs the obtained covariance matrix Ruu to the transmission signal estimating unit (step S204), and waits until another measurement start instruction signal is received (NO in step S201).

With the above-described construction, it is possible to calculate the covariance matrix Ruu taking into account the influence of a signal transmitted from the interference station 1500, even in a period during which a signal is transmitted from the radio transmission station 1000, enabling a transmission signal to be estimated following the change of the influence of the interference. Also, this eliminates the need to cause the radio transmission station 1000 to stop transmitting a signal when the unnecessary signal measuring unit 212 calculates the covariance matrix Ruu.

Described next will be the process in which the control unit 206 receives a signal indicating the modulation level of a multilevel modulation from the unnecessary signal measuring unit 212 and controls the operation timing of the unnecessary signal measuring unit 212 based on the modulation level.

Figure 21:
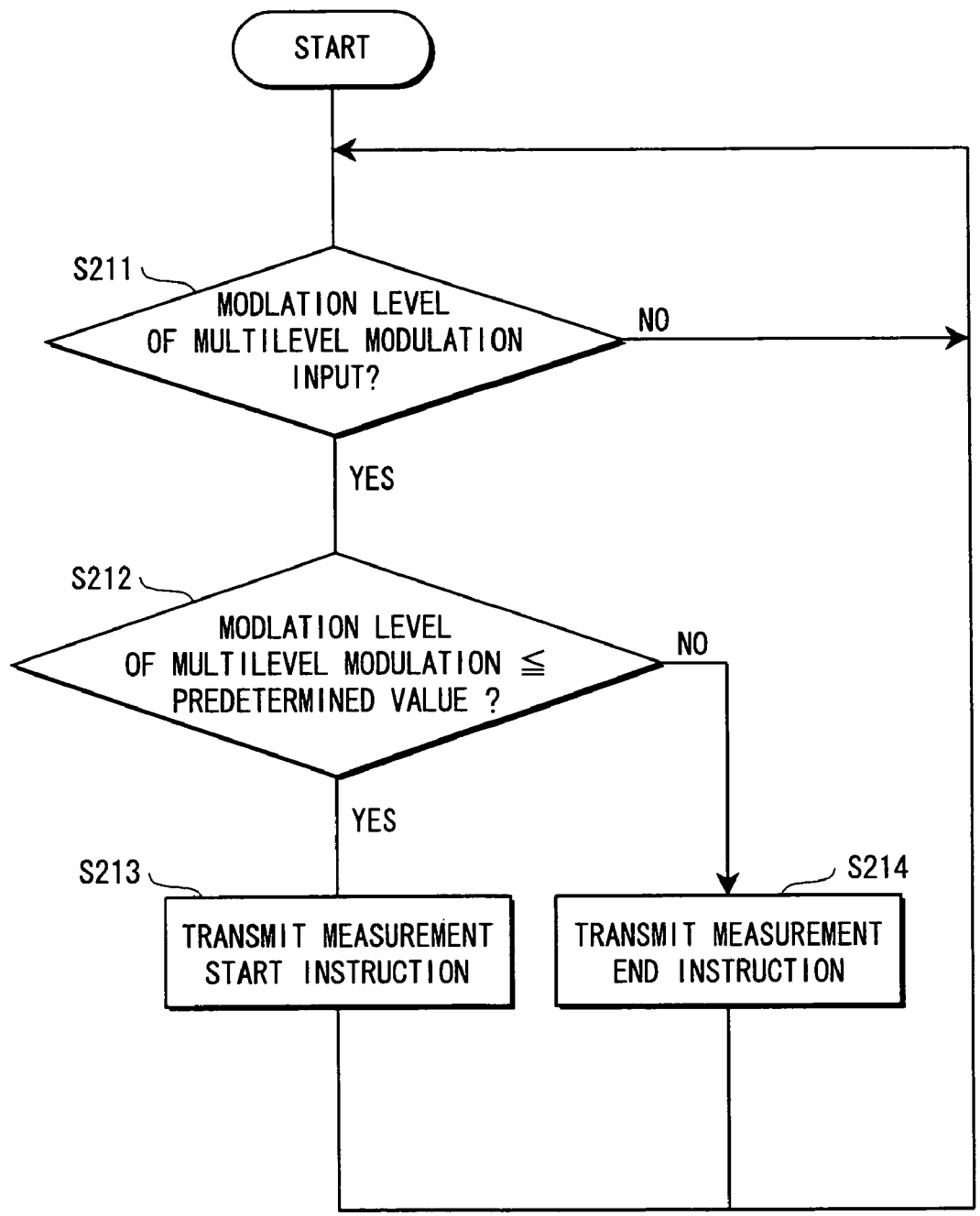
FIG. 21 is a flowchart showing the process of controlling the unnecessary signal measuring unit 212 based on the detected modulation level of the multilevel modulation, performed by the control unit 206.

FIG. 21 is a flowchart showing the process of controlling the unnecessary signal measuring unit 212 based on the detected modulation level of a multilevel modulation, performed by the control unit 206.

As shown in FIG. 21, the control unit 206, upon receiving from the unnecessary signal measuring unit 212 a signal indicating a modulation level of a multilevel modulation (YES in step S211), compares the modulation level with a predetermined value (step S212). If the modulation level is equal to or smaller than the predetermined value (YES in step S212), the control unit 206 transmits a measurement start instruction signal to the unnecessary signal measuring unit 212 (step S213). If the modulation level is greater than the predetermined value (NO in step S212), the control unit 206 does not transmit the measurement start instruction signal, or if the unnecessary signal measuring unit 212 has already started calculating the covariance matrix Ruu, transmits a measurement end instruction signal (step S214). The control unit 206 then waits until it receives from the unnecessary signal measuring unit 212 another signal indicating a modulation level of a multilevel modulation (NO in step S211), and if it receives another signal indicating a modulation level (YES in step S211), performs the above-described process to control the operation of the unnecessary signal measuring unit 212.

With the above-described construction, the radio communication device 2500 can calculate the covariance matrix Ruu based on a signal having a small modulation level of the multilevel modulation. For example, in the case where a received signal includes both a 64-QAM signal and a 16-QAM signal, the control unit 206 causes the unnecessary signal measuring unit 212 to calculate the covariance matrix Ruu using the 16-QAM signal.

In general, the smaller the modulation level of the multilevel modulation is, the less error the estimator for a transmission signal has. Accordingly, the covariance matrix Ruu becomes more accurate if an estimator having less error is used.

Embodiment 7

Next, another embodiment of the present invention will be described with reference to the attached drawings.
<Construction>

Figure 22:
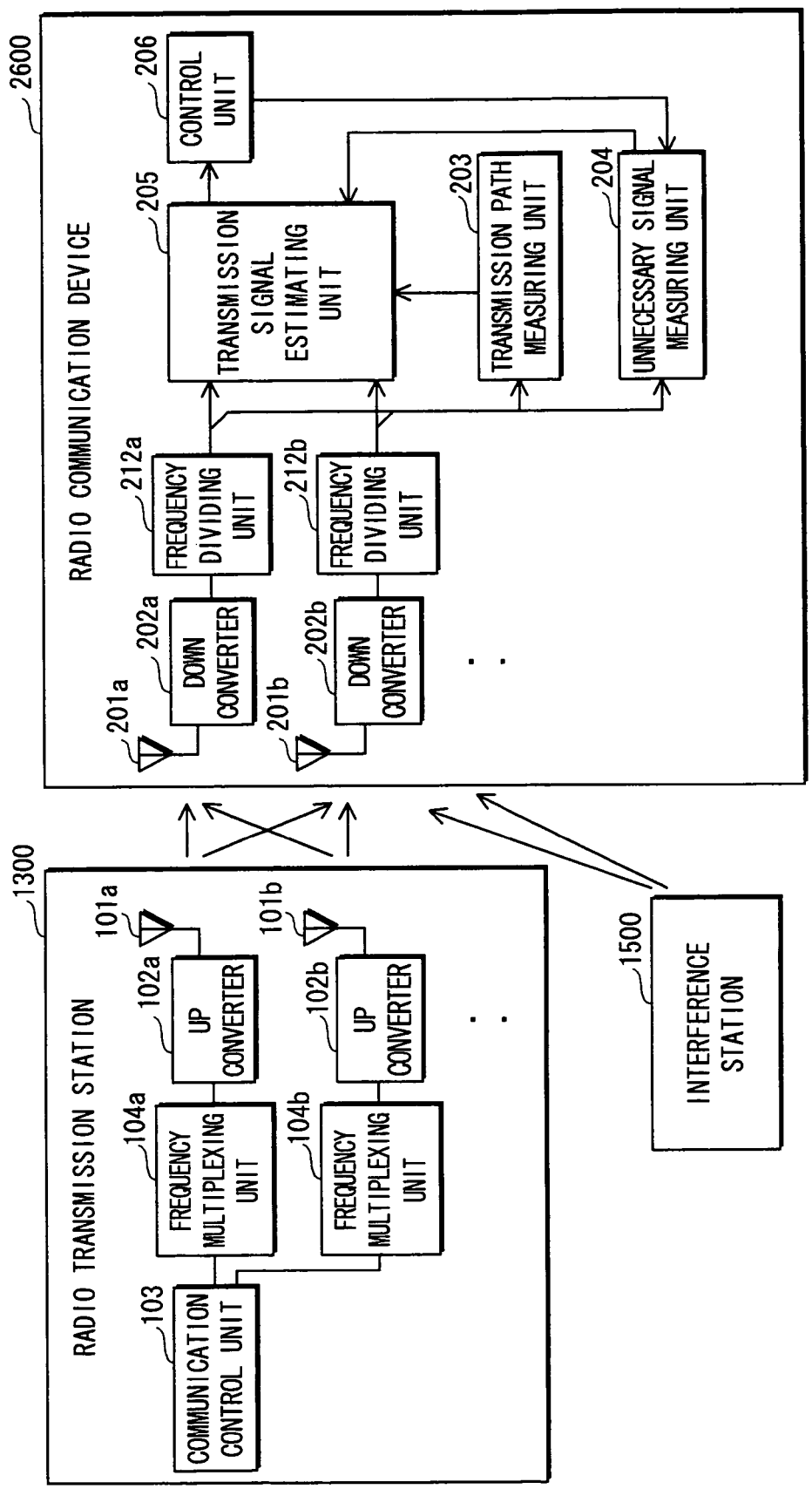
FIG. 22 is a functional block diagram of the radio communication system in Embodiment 7 of the present invention.

FIG. 22 is a functional block diagram of the radio communication system in Embodiment 7 of the present invention.

The radio communication system shown in FIG. 22 is different from that in Embodiment 1 in that the radio transmission station and the radio communication device perform a radio communication using frequency-division multiplex signals, that the radio transmission station additionally includes frequency multiplexing units 104, and that the radio communication device additionally includes frequency dividing units 212. The frequency-division multiplex signal is, for example, the OFDM signal or the wavelet signal. Description of the same components as those in Embodiment 1 will be omitted, and the differences from Embodiment 1 will be focused in the following description.
<Radio Transmission Station>

As shown in FIG. 22, a radio transmission station 1300 includes the frequency multiplexing units 104 (frequency multiplexing unit 104a, frequency multiplexing unit 104b, . . . ) in correspondence with the up converters 102 on a one-to-one basis.

The radio transmission station 1300 includes the M number of frequency multiplexing units 104 which, when a radio communication with a radio communication device 2600 is performed using, for example, the OFDM signal, function as inverse Fourier transformers. When a radio communication is performed using the wavelet signal, the frequency multiplexing units 104 function as filters corresponding to the wavelets.

FIG. 22 indicates that the M number of frequency multiplexing units 104 are provided. However, not limited to this, only one frequency multiplexing unit may be provided.

When the number of frequency components in a frequency-division multiplex signal is F, the communication control unit 103 controls the radio communication with the radio communication device 2600 by transmitting a signal composed of the F number of transmission signal vectors $s_1$ to $s_F$, to the radio communication device 2600, where "F" is an integer greater than or equal to 2.
<Radio Communication Device>

As shown in FIG. 22, the radio communication device 2600 includes the frequency dividing units 212 (frequency dividing unit 212a, frequency dividing unit 212b, . . . ) in correspondence with the down converters 202 on a one-to-one basis.

The radio communication device 2600 includes the N number of frequency dividing units 212 which, when a radio communication with the radio transmission station 1300 is performed using, for example, the OFDM signal, function as Fourier transformers. When a radio communication is performed using the wavelet signal, the frequency dividing units 212 function as filters corresponding to the wavelets.

It should be noted here that only one set of the transmission path measuring unit 203, the unnecessary signal measuring unit 204, and the transmission signal estimating unit 205 may be provided. Alternatively, a plurality of sets of these units may be provided based on the F number of frequency components. In the present embodiment, the F number of sets of the units are provided.

The frequency dividing units 212 output a component of the $f^{th}$ vector among transmission signal vectors $s_1$ to $s_F$, to the $f^{th}$ set of the transmission path measuring unit 203, the unnecessary signal measuring unit 204, and the transmission signal estimating unit 205.

The $f^{th}$ set of the transmission path measuring unit 203, the unnecessary signal measuring unit 204, and the transmission signal estimating unit 205 receives the frequency component of the $f^{th}$ vector among transmission signal vectors $s_1$ to $s_F$, as reception signal $r_f$. Based on the reception signal $r_f$, the transmission path measuring unit 203 obtains transmission path matrix $H_f$, the unnecessary signal measuring unit 204 obtains covariance matrix $Ruu_f$, and the transmission signal estimating unit 205 obtains estimator $v_f$ for transmission signal $s_f$.

<Operation>
<Radio Transmission Station>

The following explains the operation of the radio transmission station 1300 constructed as described above.

The communication control unit 103 generates transmission signal vectors $s_1$ to $s_F$, and outputs, to the frequency multiplexing units 104, components, which correspond to a certain one of the antennas 101, of each of the transmission signal vectors $s_1$ to $s_F$. That is to say, the communication control unit 103 outputs, to the $m^{th}$ antenna portion of the frequency multiplexing units 104, a component of the transmission signal vector $s_1$ corresponding to the $m^{th}$ antenna, a component of the transmission signal vector $s_2$ corresponding to the $m^{th}$ antenna, ... a component of the transmission signal vector $s_F$ corresponding to the $m^{th}$ antenna.

Upon receiving the components from the communication control unit 103, the frequency multiplexing units 104 combines the received components respectively with the $1^{st}$ to $F^{th}$ frequency shifts, and outputs the combined signals to the up converters 102.

The up converters 102 convert the combined signals output from the frequency multiplexing units 104 to high-frequency signals having a predetermined central frequency, and amplify the power of the signals to such a level that is enough to perform a radio transmission.

Upon receiving the high-frequency signals from the up converters 102, the antennas 101 transmit signals.

<Radio Communication Device>

Described next will be the operation of the radio communication device 2600 of receiving a frequency-division multiplex signal from the radio transmission station 1300.

When the antennas 201 receive a combined signal, which is a combination of a signal transmitted from the radio transmission station 1300 and a signal transmitted from the interference station 1500, the down converters 202 convert the received high-frequency signal to an equivalent baseband signal, and output the converted equivalent baseband signal to the frequency dividing units 212. The frequency dividing units 212 receive and divide the equivalent baseband signal into frequency components, and output the F number of reception signals that respectively represent the $1^{st}$ to the $F^{th}$ frequency components that correspond to the antennas connected to the down converters 202. For example, the frequency dividing unit 212a receives a signal from the down converter 202a and divides the received signal into frequency components, and outputs the F number of reception signals, which respectively represent the $1^{st}$ to the $F^{th}$ frequency components that correspond to the antenna 201a, to the transmission path measuring unit 203, the unnecessary signal measuring unit 204, and the transmission signal estimating unit 205.

The $f^{th}$ set of the transmission path measuring unit 203, the unnecessary signal measuring unit 204, and the transmission signal estimating unit 205 receives the $f^{th}$ frequency components, which correspond to the $1^{st}$ to the $N^{th}$ antennas, as "$r_f$". Upon receiving the "$r_f$", the transmission signal estimating unit 205 obtains estimator $v_f$ for transmission signal $s_f$, based on the received "$r_f$", and outputs the obtained estimator $v_f$ to the control unit 206.

Embodiment 8

Next, another embodiment of the present invention will be described with reference to the attached drawings.
<Construction>

Figure 23:
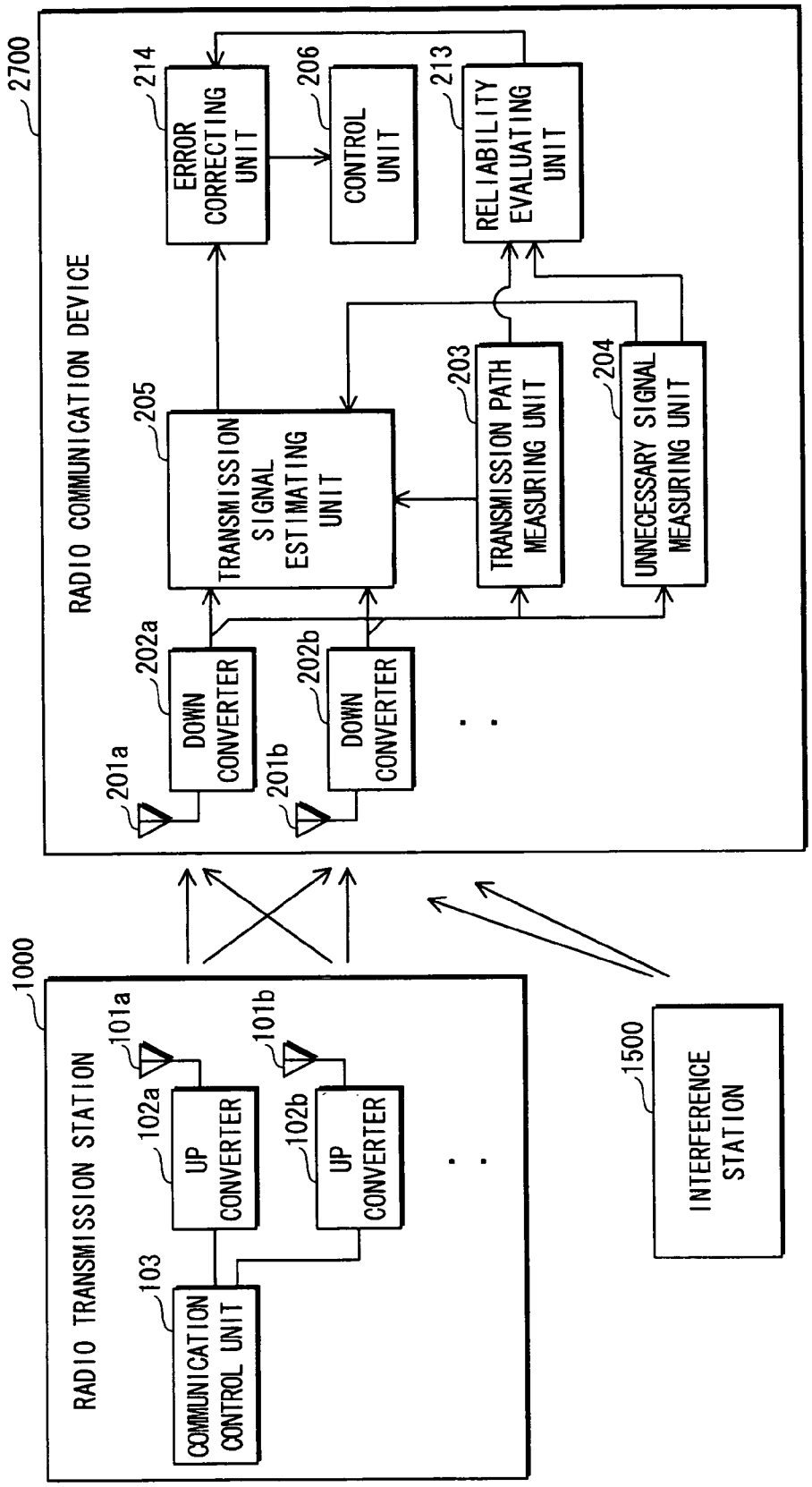
FIG. 23 is a functional block diagram of the radio communication system in Embodiment 2 of the present invention.

FIG. 23 is a functional block diagram of the radio communication system in Embodiment 8 of the present invention.

The radio communication system shown in FIG. 23 is different from that in Embodiment 1 in that the radio communication device additionally includes a reliability evaluating unit 213 and an error correcting unit 214. Description of the same components as those in Embodiment 1 will be omitted, and the differences from Embodiment 1 will be focused in the following description.
<Radio Communication Device>

As shown in FIG. 23, a radio communication device 2700 includes the reliability evaluating unit 213 and the error correcting unit 214.

The reliability evaluating unit 213 is a circuit that performs a predetermined calculation, receives transmission path matrix H and covariance matrix Ruu from the transmission path measuring unit 203 and the unnecessary signal measuring unit 204, and stores the received transmission path matrix H and covariance matrix Ruu into a memory provided therein.

The transmission path matrix H and covariance matrix Ruu stored in the memory are overwritten with newly received values of them each time the reliability evaluating unit 213 newly receives transmission path matrix H or covariance matrix Ruu from the transmission path measuring unit 203 or the unnecessary signal measuring unit 204. And each time it overwrites transmission path matrix H or covariance matrix Ruu, the reliability evaluating unit 213 obtains estimator z of the residual error contained in the estimator v for a transmission signal, from the stored transmission path matrix H and covariance matrix Ruu, in accordance with a predetermined expression.

Here, the predetermined expression used for obtaining the estimator z of the residual error will be described. It is presumed here that the transmission signal estimating unit 205 performs an estimation of a transmission signal based on "v=Wr", indicated as [Expression 3]. The reliability evaluating unit 213 calculates z[k] in accordance with the following expression [Expression 15] where z[k] indicates an operation on the $k^{th}$ element among vectors of estimator z of the residual error.

$$z[k]=(W[k]H-I_M[k])Rss(H^H W[k]^H - I_M[k]^H) + W[k]Ruu W[k]^H \quad \text{[Expression 15]}$$

In the above expression: W[k] represents a row vector of the $k^{th}$ row when W represents a matrix; W[k] represents the $k^{th}$ element of W when W represents a column vector; $I_M[k]$ represents a row vector of the $k^{th}$ row in an M×M unit matrix when M is 2 or more; and $I_M[k]$ represents 1 when M is 1.

Here, explanation will be given to the above-described [Expression 15].

A value y[k], which represents an error amplitude included in the $k^{th}$ element of a column vector, is represented by the following [Expression 16].

$$y[k] = (Wr)[k] - s[k]$$
$$= W[k](Hs + u) - s[k]$$
$$= (W[k]H - I_M[k])s + W[k]u$$
[Expression 16]

Here, the square mean value of y[k] is represented by the following [Expression 17].

$$E[|y[k]|^2] = (W[k]H - I_M[k])Rss(H^H W[k]^H - I_M[k]^H) + W[k]Ruu W[k]^H$$
[Expression 17]

The above-described [Expression 15] is equivalent with [Expression 17].

Here, [Expression 15] can be represented as the following [Expression 18] when the elements of the transmission signal "s" are uncorrelated with each other and when each element has an equivalent average power that is represented as "p".

$$z[k] = p(W[k]H - I_M[k])(H^H W[k]^H - I_M[k]^H) + W[k]Ruu W[k]^H$$
[Expression 18]

When the value "z" is obtained using [Expression 18], the amount of calculation of the product of a matrix is reduced, compared with the case where [Expression 15] is used.

Further, the reliability evaluating unit 213 calculates a reliability level of the estimator v for the transmission signal, based on the estimator z of the residual error, and outputs the calculated reliability level to the error correcting unit 214.

As one example, the reliability level may be smaller as the estimator z of the residual error, which is calculated in accordance with [Expression 15], increases, and may be greater as the estimator z of the residual error decrease. That is to say, the greater the reliability level is, the smaller the residual error included in the estimator v for a transmission signal is.

The error correcting unit 214 is an error correcting circuit that corrects an error included in a signal, and is, for example, a Viterbi decoding circuit. The error correcting unit 214 may include a deinterleave circuit, as well as the Viterbi decoding circuit. The error correcting unit 214 is provided with a memory for storing the reliability level output from the reliability evaluating unit 213, and performs an error correction of the estimator v for a transmission signal in accordance with the reliability level. The error correction in accordance with the reliability level is, for example, to disregard an estimator for a transmission signal whose reliability level is smaller than a predetermined value, and stress the importance of an estimator for a transmission signal whose reliability level is greater than the predetermined value.

After performing the error correction, the error correcting unit 214 outputs the data after the error correction to the control unit 206.

In the Viterbi decoding or the like, the performance of the error correction improves when the amplitude of the residual error included in the estimator v for a transmission signal is constant. With this taken into account, it is preferable to normalize the residual error by the inverse of the square root of the square mean value. It is thus preferable that the reliability evaluating unit 213 obtains the reliability level of the $k^{th}$ element of an estimator v for a transmission signal, in accordance with a value that is inversely proportional to the square root of z[k], based on z[k].

<Operation>

Next, the operation of the radio communication device 2700 will be described with reference to the drawings.

Figure 24:
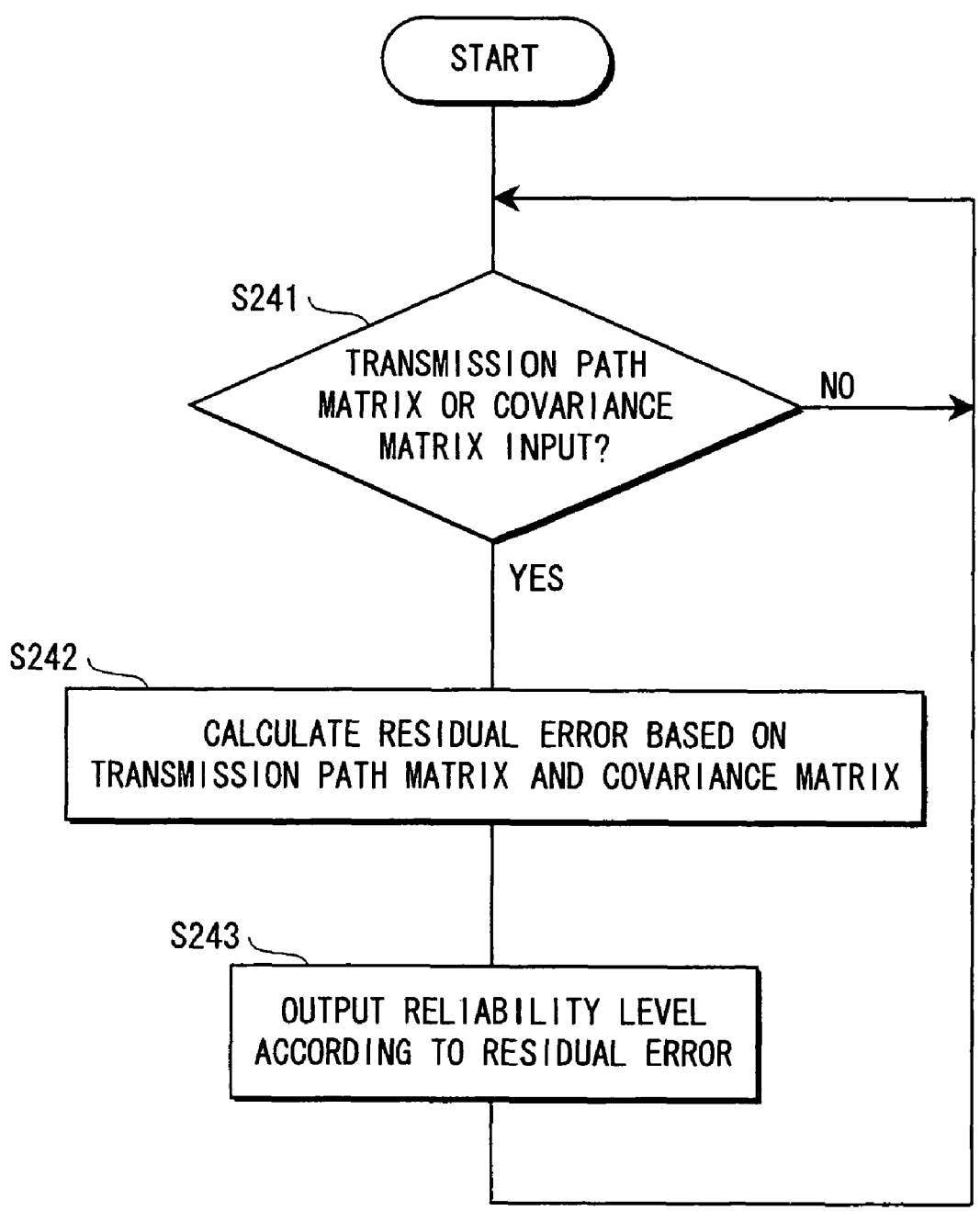
FIG. 24 is a flowchart showing the process performed by the reliability evaluating unit 213.

FIG. 24 is a flowchart showing the process performed by the reliability evaluating unit 213.

As shown in FIG. 24, upon receiving a transmission path matrix H from the transmission path measuring unit 203 or upon receiving a covariance matrix Ruu from the unnecessary signal measuring unit 204 (YES in step S241), the reliability evaluating unit 213 calculates residual error z based on the transmission path matrix H and covariance matrix Ruu (step S242). The reliability evaluating unit 213 then evaluates the reliability by obtaining a reliability level in accordance with the calculated residual error, and outputs the obtained reliability level to the error correcting unit 214 (step S243). The reliability evaluating unit 213 then waits until it receives a transmission path matrix H or a covariance matrix Ruu (NO in step S241), and each time it receives a transmission path matrix H or a covariance matrix Ruu (YES in step S241), the reliability evaluating unit 213 calculates a residual error and obtains and outputs a reliability level (steps S242, S243).

Next, the process performed by the error correcting unit 214 will be described. The error correcting unit 214 performs an error correction in accordance with the reliability level. Each time the reliability evaluating unit 213 outputs are liability level, the error correcting unit 214 holds the output reliability level, and performs an error correction in accordance with the currently held reliability level.

Figure 25:
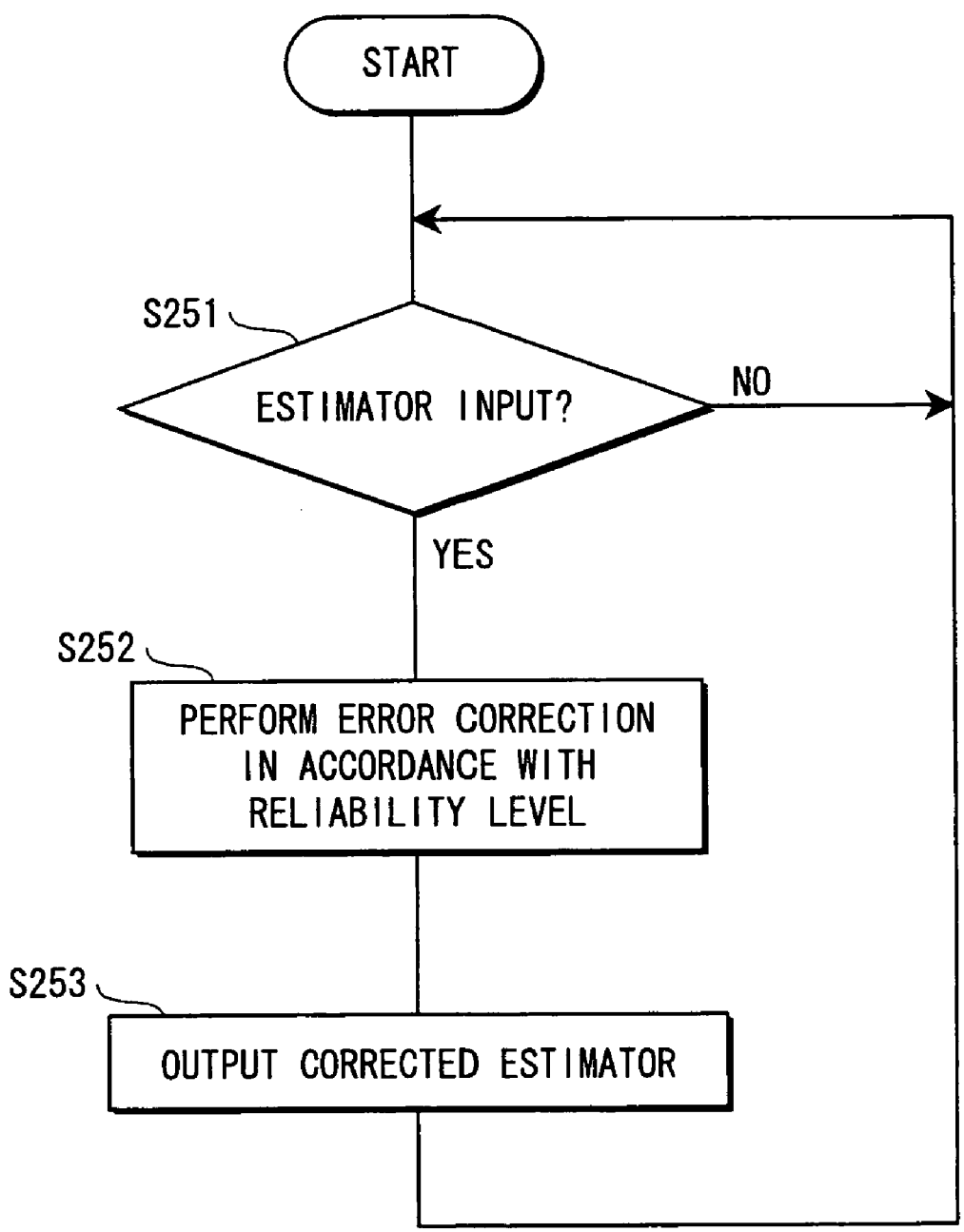
FIG. 25 is a flowchart showing the process performed by the error correcting unit 214.

FIG. 25 is a flowchart showing the process performed by the error correcting unit 214.

As shown in FIG. 25, upon receiving from the transmission signal estimating unit 205 an estimator v for a transmission signal (YES in step S251), the error correcting unit 214 performs an error correction on the received estimator v in accordance with the reliability level it holds (step S252). The error correcting unit 214 then outputs the corrected estimator v to the control unit 206 (step S253). Then, each time it receives an estimator v for a transmission signal, the error correcting unit 214 performs an error correction in accordance with the reliability level it holds.

<Supplementary Notes>

Although the present invention has been described through embodiments thereof, it is to be noted that not limited to these embodiments, the present invention can be modified variously. The following indicates some of such modifications.

(1) In Embodiment 1, the covariance matrix Ruu is corrected using the gain of the down converters 202 in the period during which the unnecessary signal measuring unit 204 calculates the covariance matrix Ruu, and the gain of the down converters 202 in the period during which the transmission signal estimating unit 205 estimates a transmission signal. However, the radio communication device 2000 may control the down converters 202 so that the gains of the down converters 202 in the above-described two periods become identical to each other.

(2) The present invention also includes the case where a radio communication device estimates a signal transmitted from a radio transmission station in accordance with the method of the present invention when a data communication is performed between the radio transmission station and the radio communication device, where, for example, the radio transmission station has a mapping unit and the radio communication device has a demapping unit.

(3) The process performed by the interference transmission path measuring unit 209 in Embodiment 4 may be performed by the transmission path measuring unit 203.

(4) Each device described above may be, specifically, a computer system including a microprocessor, a ROM, a RAM, a hard disk unit, a display unit, a keyboard, a mouse and the like. A computer program is recorded in the RAM or the hard disk unit. Each device achieves its functions as the microprocessor operates in accordance with the computer program. Here, the computer program is composed of a plurality of instruction codes that instruct the computer so as to achieve certain functions.

(5) Part or all of the constituent elements of each device described above can be realized as one system LSI (Large Scale Integration). The system LSI is a super-multifunctional LSI manufactured by integrating a plurality of constituent units on one chip, and more specifically is a computer system including a microprocessor, a ROM, a RAM and the like. A computer program is recorded in the RAM. The system LSI achieves its functions as the microprocessor operates in accordance with the computer program.

(6) The present invention may be any combination of the above-described embodiments.

INDUSTRIAL APPLICABILITY

The radio communication device of the present invention is useful for, for example, a wireless LAN device that transmits and receives signals via radio communications. Especially, the present invention is suitable for achieving a radio communication with reduced errors even if an interference signal is present.

The invention claimed is:

1. A radio communication device which identifies a radio transmission station as a communication partner based on a patterned signal which has a predetermined pattern and is contained in a signal transmitted from the radio transmission station, and performs a radio communication with the identified radio transmission station, the radio communication device comprising:
a plurality of antennas;
a signal receiving unit operable to receive a signal via the plurality of antennas;
a first calculating unit operable to calculate, based on the received signal, a numerical sequence that indicates a property of a signal transmission path used in a radio communication with the radio transmission station;
a second calculating unit operable to calculate, based on the received signal, a numerical sequence that indicates a property of an unnecessary signal that is a component of the received signal and that does not have the predetermined pattern; and
a transmission signal estimating unit operable to correct the received signal so as to remove the unnecessary signal from the received signal based on the numerical sequence calculated by the second calculating unit, and estimate a signal transmitted from the radio transmission station based on the corrected received signal and the numerical sequence calculated by the first calculating unit,
wherein the transmission signal estimating unit obtains an estimator "v" of "s" that denotes a column vector representing a signal transmitted from the radio transmission station, in accordance with a following expression:

$$v = RssH^H(HRssH^H + Ruu)^{-1}r,$$

wherein "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "$^H$" denotes a complex conjugate transposition, and "$^{-1}$" denotes an inverse matrix.

2. The radio communication device of claim 1, wherein when elements of the column vector "s" are uncorrelated with each other and when each of the elements has an equivalent average power that is denoted as "p",
the estimator "v" of the column vector "s" is obtained in accordance with a following expression:

$$v = H^H(HH^H + (1/p)Ruu)^{-1}r.$$

3. A radio communication device which identifies a radio transmission station as a communication partner based on a patterned signal which has a predetermined pattern and is contained in a signal transmitted from the radio transmission station, and performs a radio communication with the identified radio transmission station, the radio communication device comprising:
a plurality of antennas;
a signal receiving unit operable to receive a signal via the plurality of antennas;
a first calculating unit operable to calculate, based on the received signal, a numerical sequence that indicates a property of a signal transmission path used in a radio communication with the radio transmission station;
a second calculating unit operable to calculate, based on the received signal, a numerical sequence that indicates a property of an unnecessary signal that is a component of the received signal and that does not have the predetermined pattern;
a transmission signal estimating unit operable to correct the received signal so as to remove the unnecessary signal from the received signal based on the numerical sequence calculated by the second calculating unit, and estimate a signal transmitted from the radio transmission station based on the corrected received signal and the numerical sequence calculated by the first calculating unit; and
a reliability evaluating unit operable to calculate a residual error contained in the signal estimated by the transmission signal estimating unit based on the numerical sequence calculated by the first calculating unit and the numerical sequence calculated by the second calculating unit,
wherein the reliability evaluating unit obtains an estimator "z[k]" of a residual error corresponding to a $k^{th}$ element of "v", in accordance with a following expression:

$$z[k] = (W[k]H - I_M[k])Rss(H^H W[k]^H - I_M[k]^H) + W[k]RuuW[k]^H,$$

wherein "W" is obtained in accordance with a following expression:

$$W = RssH^H(HRssH^H + Ruu)^{-1}r,$$

wherein "s" denotes a column vector representing a signal transmitted from the radio transmission station, "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "v" denotes a column vector representing, by an equivalent baseband system, an estimator obtained by the transmission signal estimating unit, a dimension of the column vector "s" is represented as "M×1", "$^H$" denotes a complex conjugate transposition, "$^{-1}$" denotes an inverse matrix, and wherein W[k] represents a row vector of a $k^{th}$ row when W represents a matrix; W[k] represents a $k^{th}$ element of W when W represents a column vector; $I_M[k]$ represents a row vector of a $k^{th}$ row in an M×M unit matrix when M is 2 or more; and $I_M[k]$ represents 1 when M is 1.

4. A radio communication device which identifies a radio transmission station as a communication partner based on a patterned signal which has a redetermined pattern and is contained in a signal transmitted from the radio transmission station, and performs a radio communication with the identified radio transmission station, the radio communication device comprising:

a plurality of antennas;

a signal receiving unit operable to receive a signal via the plurality of antennas;

a first calculating unit operable to calculate, based on the received signal, a numerical sequence that indicates a property of a signal transmission path used in a radio communication with the radio transmission station;

a second calculating unit operable to calculate, based on the received signal, a numerical sequence that indicates a property of an unnecessary signal that is a component of the received signal and that does not have the predetermined pattern;

a transmission signal estimating unit operable to correct the received signal so as to remove the unnecessary signal from the received signal based on the numerical sequence calculated by the second calculating unit, and estimate a signal transmitted from the radio transmission station based on the corrected received signal and the numerical sequence calculated by the first calculating unit; and a reliability evaluating unit operable to calculate a residual error contained in the signal estimated by the transmission signal estimating unit based on the numerical sequence calculated by the first calculating unit and the numerical sequence calculated by the second calculating unit, wherein the reliability evaluating unit obtains an estimator "z[k]" of a residual error corresponding to a $k^{th}$ element of "v", in accordance with a following expression:

$$z[k]=p(W[k]H-I_M[k])(H^H W[k]^H - I_M[k]^H) + W[k]R_{uu}W[k]^H,$$

wherein "W" is obtained in accordance with a following expression when elements of a transmission signal "s" are uncorrelated with each other and when each element has an equivalent average power that is denoted as "p":

$$W=H^H(HH^H+(1/p)R_{uu})^{-1},$$

wherein "s" denotes a column vector representing a signal transmitted from the radio transmission station, "Rss" denotes a covariance matrix of the column vector "s", "r" denotes a column vector representing the signal received by the signal receiving unit, "H" denotes a matrix being the numerical sequence calculated by the first calculating unit, "Ruu" denotes a covariance matrix being the numerical sequence calculated by the second calculating unit, "v" denotes a column vector representing, by an equivalent baseband system, an estimator obtained by the transmission signal estimating unit, a dimension of the column vector "s" is represented as "M×1", "$^H$" denotes a complex conjugate transposition, "$^{-1}$" denotes an inverse matrix, and wherein W[k] represents a row vector of a $k^{th}$ row when W represents a matrix; W[k] represents a $k^{th}$ element of W when W represents a column vector; $I_M[k]$ represents a row vector of a $k^{th}$ row in an M×M unit matrix when M is 2 or more; and $I_M[k]$ represents 1 when M is 1.

* * * * *